(12) United States Patent
Ishida et al.

(10) Patent No.: US 11,895,446 B2
(45) Date of Patent: Feb. 6, 2024

(54) CONTROL DEVICE, CONTROL METHOD, CONTROL PROGRAM, AND PROJECTION SYSTEM

(71) Applicant: FUJIFILM Corporation, Tokyo (JP)

(72) Inventors: Kazuki Ishida, Saitama (JP); Akihiro Ishizuka, Saitama (JP); Tomonori Masuda, Saitama (JP); Kazuki Inoue, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 141 days.

(21) Appl. No.: 17/704,084

(22) Filed: Mar. 25, 2022

(65) Prior Publication Data
US 2022/0217313 A1    Jul. 7, 2022

Related U.S. Application Data

(63) Continuation of application No. PCT/JP2020/032786, filed on Aug. 28, 2020.

(30) Foreign Application Priority Data

Sep. 27, 2019  (JP) .................. 2019-177951

(51) Int. Cl.
  *H04N 9/31*    (2006.01)
(52) U.S. Cl.
  CPC ......... *H04N 9/3185* (2013.01); *H04N 9/3147* (2013.01); *H04N 9/3194* (2013.01)
(58) Field of Classification Search
  None
  See application file for complete search history.

(56) References Cited

U.S. PATENT DOCUMENTS

| | | | |
|---|---|---|---|
| 8,947,469 B2* | 2/2015 | Tanaka | G09G 3/20 345/204 |
| 2008/0002160 A1* | 1/2008 | Chang | G06T 5/006 353/94 |

(Continued)

FOREIGN PATENT DOCUMENTS

| | | |
|---|---|---|
| JP | 2005-286772 A | 10/2005 |
| JP | 2008-39795 A | 2/2008 |

(Continued)

OTHER PUBLICATIONS

International Preliminary Report on Patentability (Form PCT/IPEA/409) for International Application No. PCT/JP2020/032786, dated Oct. 4, 2021, with an English translation.

(Continued)

*Primary Examiner* — Stuart D Bennett
(74) *Attorney, Agent, or Firm* — Birch, Stewart, Kolasch & Birch, LLP

(57) ABSTRACT

A control device controls projection by a plurality of projection units having different projection ranges. A control unit projects, by the plurality of projection units a first image in which a content is disposed on a first projection range having the projection ranges of the plurality of projection units. An acquisition unit acquires first attribute information associated with the content and indicating whether an aspect ratio is made to be changeable or is maintained in a case in which a size of the content is adjusted. The control unit projects a second image in which at least a part of the contents is disposed on a second projection range, and, in a state in which projection is performed by a projection unit except a part of the plurality of projection units, adjusts the size of the content in generation of the second image based on the first attribute information.

24 Claims, 18 Drawing Sheets

(56) References Cited

U.S. PATENT DOCUMENTS

| | | | |
|---|---|---|---|
| 2008/0143978 A1 | 6/2008 | Damera-Venkata et al. | |
| 2012/0038685 A1 | 2/2012 | Tanaka et al. | |
| 2013/0222386 A1* | 8/2013 | Tannhauser | H04N 9/3185 345/428 |
| 2013/0257683 A1* | 10/2013 | Aruga | G09G 5/006 345/1.2 |
| 2019/0187671 A1* | 6/2019 | Lee | G05B 23/02 |

FOREIGN PATENT DOCUMENTS

| | | |
|---|---|---|
| JP | 2010-176030 A | 8/2010 |
| JP | 2014-194464 A | 10/2014 |
| JP | 2016-161820 A | 9/2016 |
| JP | 2017-3910 A | 1/2017 |
| JP | 2017-16067 A | 1/2017 |
| JP | 2017-191974 A | 10/2017 |
| JP | 2018-4809 A | 1/2018 |
| KR | 10-2019-0056740 A | 5/2019 |

OTHER PUBLICATIONS

International Search Report (Form PCT/ISA/210) for International Application No. PCT/JP2020/032786, dated Nov. 24, 2020, with an English translation.

* cited by examiner

FIG. 6
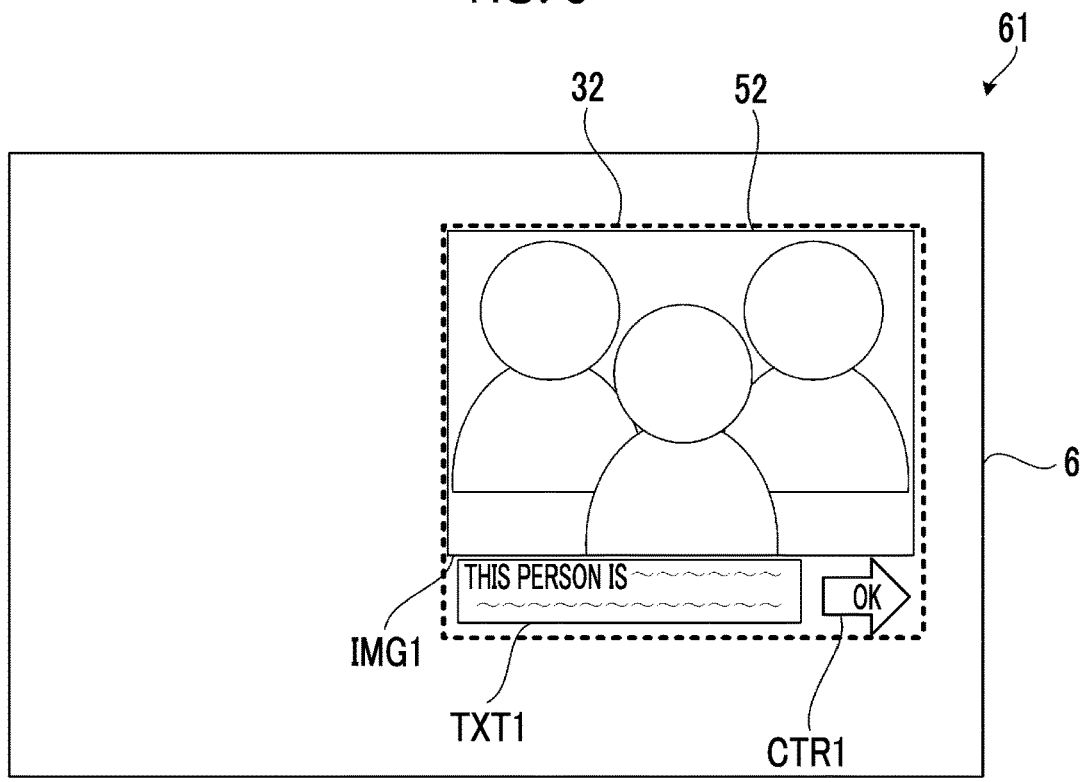
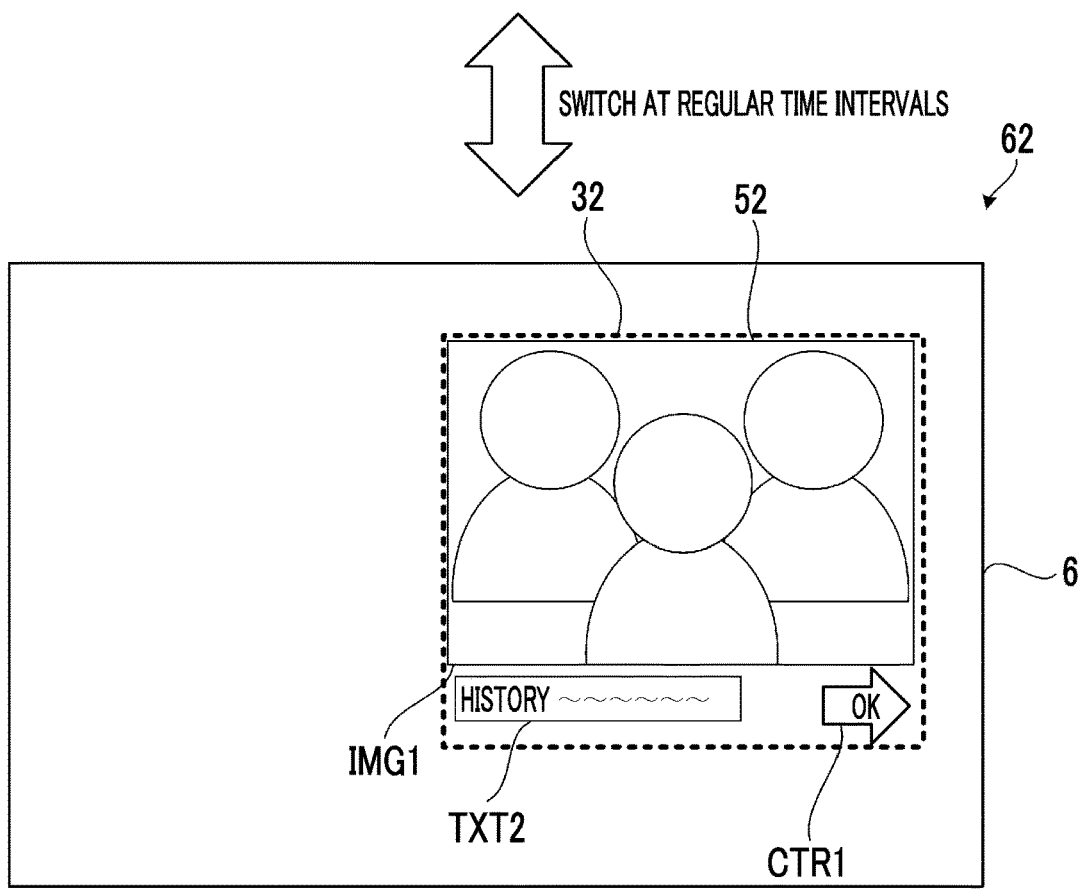

FIG. 8

| | Keep_aspect | Always_disp | Type | Min_Size_rate | Priority |
|---|---|---|---|---|---|
| IMG1 | 1 | 1 | picture | R1 | P1 |
| TXT1 | 0 | 0 | text | R2 | P2 |
| TXT2 | 0 | 0 | text | R3 | P3 |
| CTR1 | 0 | 1 | control | R4 | P4 |

80

FIG. 14
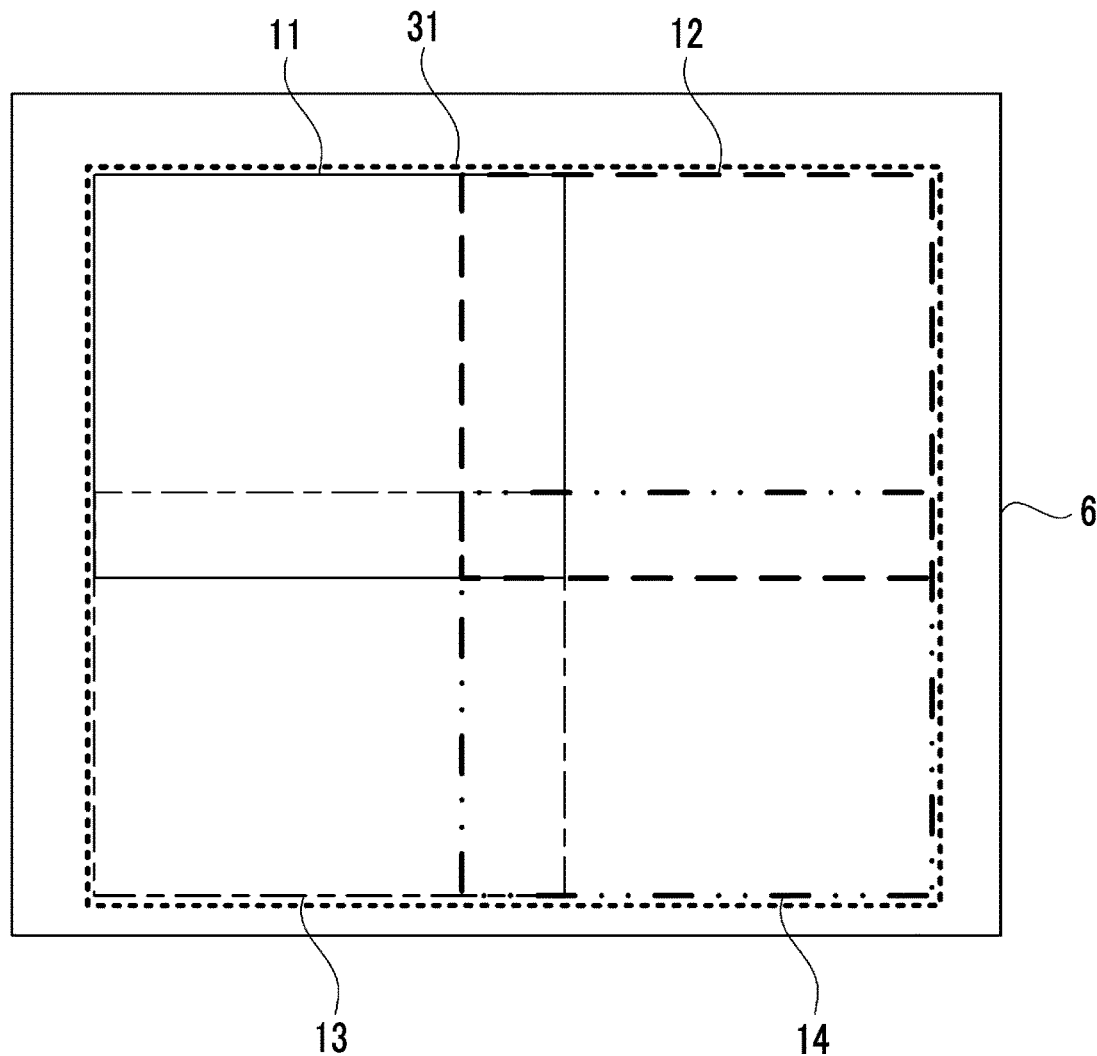
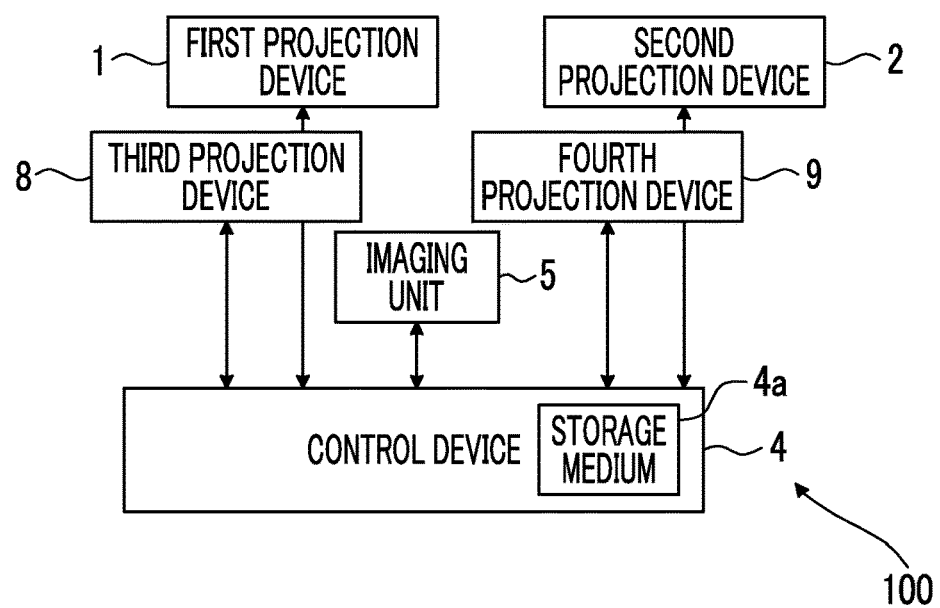

FIG. 15
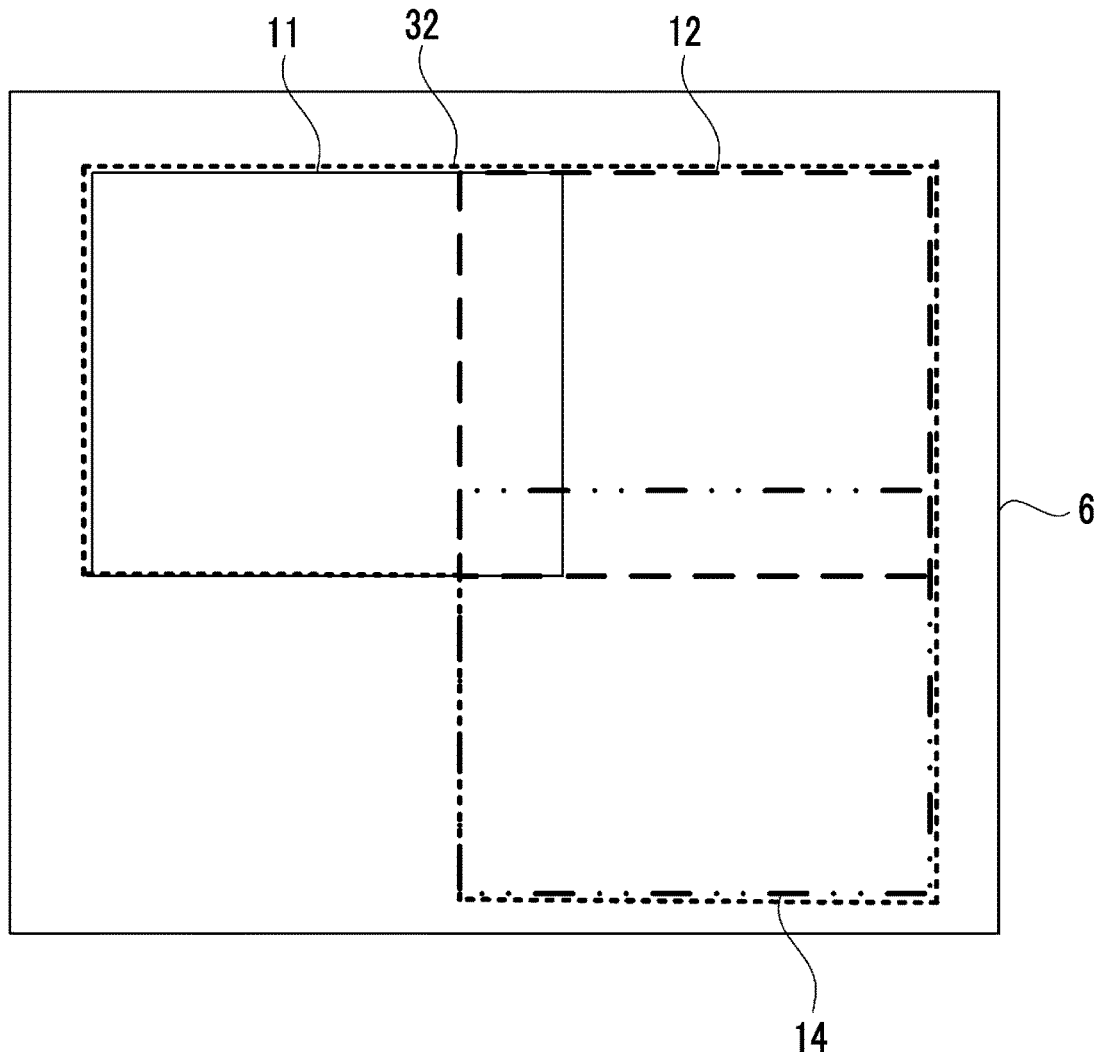
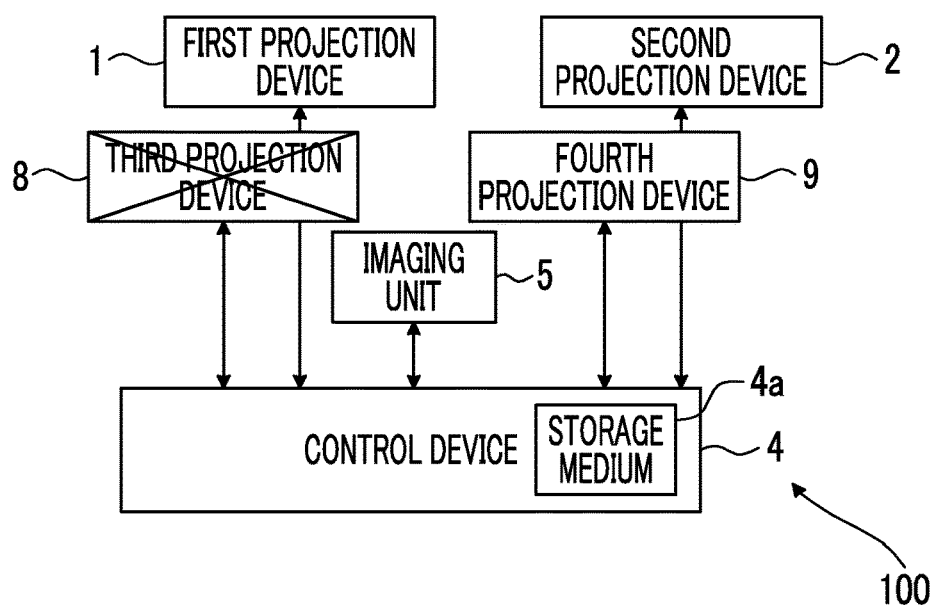

FIG. 18
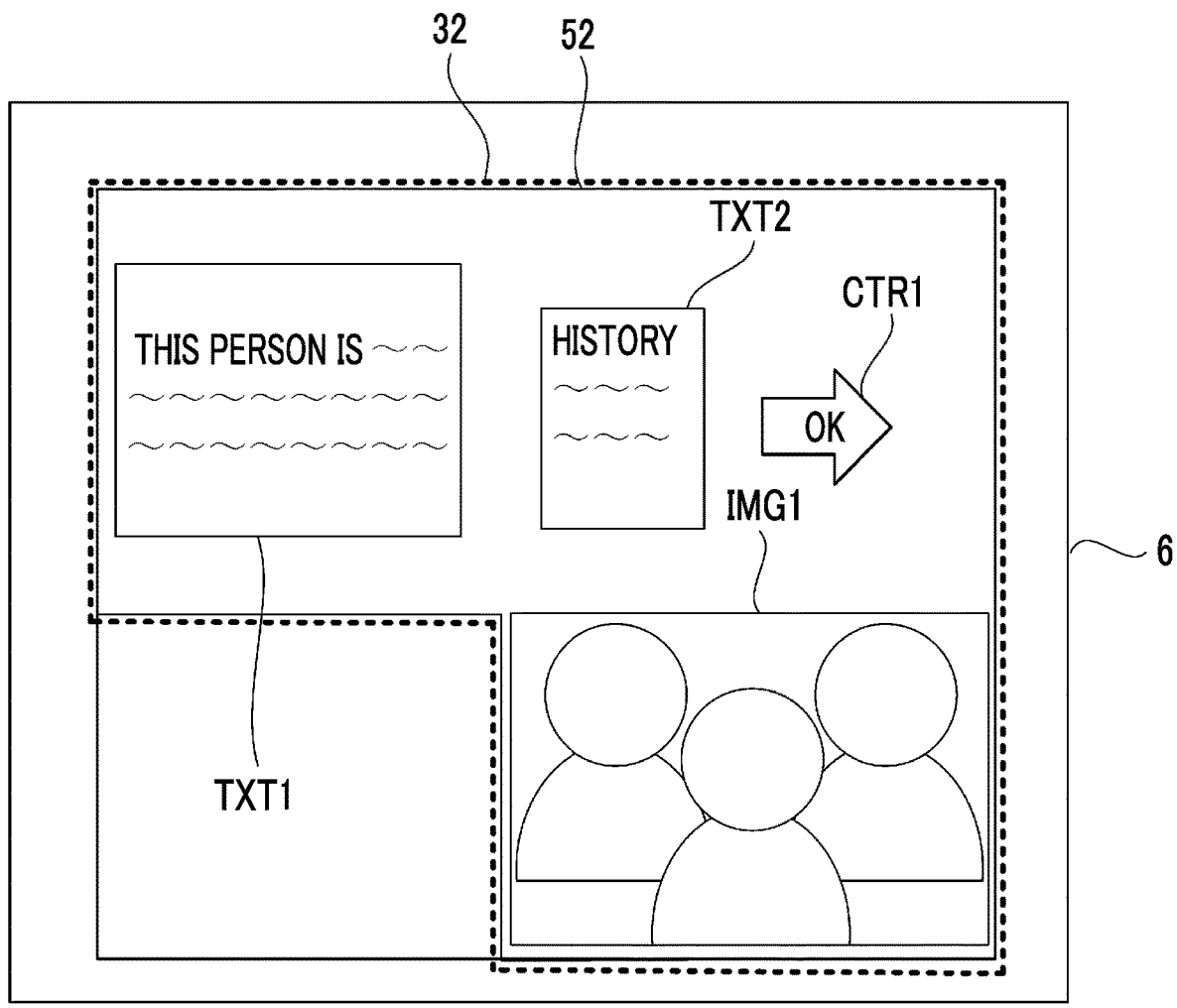
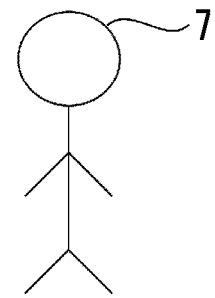

CONTROL DEVICE, CONTROL METHOD, CONTROL PROGRAM, AND PROJECTION SYSTEM

CROSS REFERENCE TO RELATED APPLICATION

This is a continuation of International Application No. PCT/JP2020/032786 filed on Aug. 28, 2020, and claims priority from Japanese Patent Application No. 2019-177951 filed on Sep. 27, 2019, the entire disclosures of which are incorporated herein by reference.

BACKGROUND OF THE INVENTION

1. Field of the Invention

The present invention relates to a control device, a control method, a computer readable medium storing a control program, and a projection system.

2. Description of the Related Art

In the related art, a projection system that displays one image on a large screen by dividing one image to generate a plurality of division images, and projecting the division images by a plurality of projection devices has been known (for example, see JP2005-286772A and JP2014-194464A). In addition, the technology of, in a case in which a failure of a part of projection devices occurs in a projection system that displays an image on a large screen by using a plurality of projection devices, projecting a reduced image onto a projectable region of the remaining projection devices (for example, see JP2018-4809A and JP2017-3910A).

SUMMARY OF THE INVENTION

One embodiment according to the technology of the present disclosure provides a control device for projection, a control method, a computer readable medium storing a control program, and a projection system that can efficiently perform information display using a projectable region even in a state in which a part of projection devices cannot perform projection.

An aspect of the present invention relates to a control device that controls projection by a plurality of projection units having different projection ranges, the device comprising a control unit that projects, by the plurality of projection units, a first image in which at least one content image is disposed on a first projection range having the projection ranges of the plurality of projection units, and an acquisition unit that acquires first attribute information which is associated with the content image and indicates whether an aspect ratio is made to be changeable or is maintained in a case in which a size of the content image is adjusted, in which the control unit projects a second image in which at least a part of the content image is disposed on a second projection range having a projection range of a projection unit except a part of projection units among the plurality of projection units, and adjusts the size of the content image in generation of the second image based on the first attribute information in a state in which projection is performed by the projection unit excluding the part of projection units among the plurality of projection units.

Another aspect of the present invention relates to a control method of controlling projection by a plurality of projection units having different projection ranges, the method comprising a control step of projecting, by the plurality of projection units, a first image in which at least one content image is disposed on a first projection range having the projection ranges of the plurality of projection units, and an acquisition step of acquiring first attribute information which is associated with the content image and indicates whether an aspect ratio is made to be changeable or is maintained in a case in which a size of the content image is adjusted, in which in the control step, a second image in which at least a part of the content image is disposed is projected on a second projection range having a projection range of a projection unit excluding a part of projection units among the plurality of projection units, and the size of the content image is adjusted in generation of the second image based on the first attribute information in a state in which projection is performed by the projection unit except the part of projection units among the plurality of projection units.

Still another aspect of the present invention relates to a control program causing a computer to function as the acquisition unit and the control unit of the control device according to the aspect described above.

Still another aspect of the present invention relates to a projection system comprising the control device according to the aspect described above, and the plurality of projection units.

According to the present invention, it is possible to provide a control device for projection, a control method, a control program, and a projection system that can efficiently perform information display using a projectable region even in a state in which a part of projection devices cannot perform projection.

BRIEF DESCRIPTION OF THE DRAWINGS

FIG. 6 is a schematic diagram showing another example of the projection of the second image 52 only by the second projection device 2.

FIG. 8 is a diagram showing an example of attribute information of a content acquired by an acquisition unit 41 shown in FIG. 7.

FIG. 14 is a schematic diagram showing a modification example of the projection system 100.

FIG. 15 is a schematic diagram showing a state in which projection is performed only by the first projection device 1, the second projection device 2, and a fourth projection device 9 shown in FIG. 14.

FIG. 18 is a schematic diagram showing another example of the projection of the second image 52 only by the first projection device 1, the second projection device 2, and the fourth projection device 9 shown in FIG. 15.

DESCRIPTION OF THE PREFERRED EMBODIMENTS

Hereinafter, an embodiment of the present invention will be described with reference to the drawings.

Figure 1:
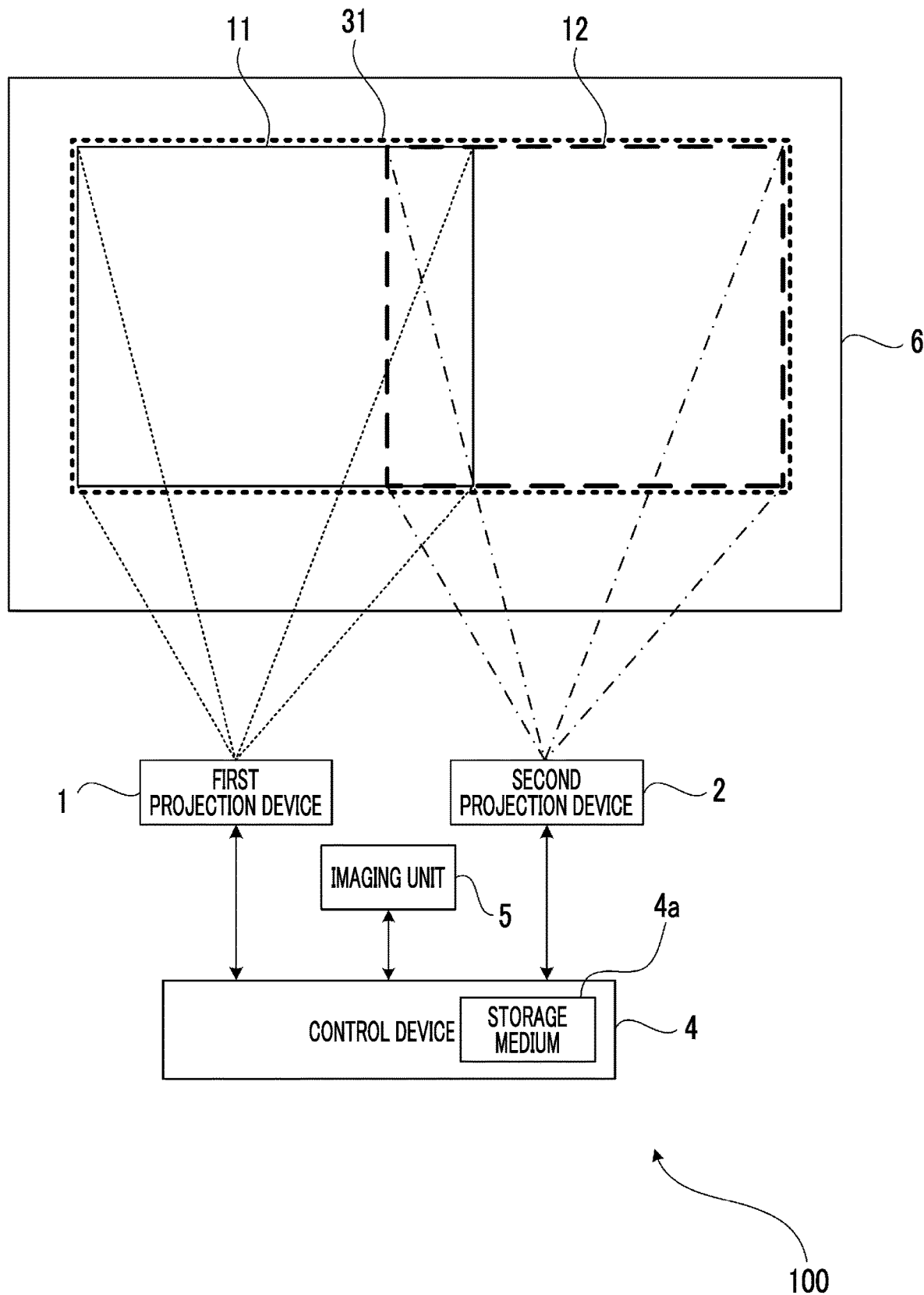
FIG. 1 is a schematic diagram showing a schematic configuration of a projection system 100, which is an embodiment of a projection system of the present invention.

FIG. 1 is a schematic diagram showing a schematic configuration of a projection system 100, which is the embodiment of a projection system of the present invention. The projection system 100 comprises a first projection device 1, a second projection device 2, a control device 4, an imaging unit 5, and a screen 6. The first projection device 1 and the second projection device 2 are each configured by, for example, a liquid crystal projector, a projector using liquid crystal on silicon (LCOS), or the like. Hereinafter, it is assumed that each of the first projection device 1 and the second projection device 2 is the liquid crystal projector.

A first device projection range 11 is a projection range of the first projection device 1 on the screen 6. A second device projection range 12 is a projection range of the second projection device 2 on the screen 6, and is a range different from the first device projection range 11. In the example shown in FIG. 1, the second device projection range 12 is a range with which only a part of the first device projection range 11 overlaps.

A first system projection range 31 is a projection range having the first device projection range 11 and the second device projection range 12. For convenience of illustration, the first system projection range 31 is shown by a broken line frame slightly larger than an actual size. Specifically, the first system projection range 31 has a horizontally long rectangular shape including a portion of the first device projection range 11 that does not overlap with the second device projection range 12, a portion in which the first device projection range 11 and the second device projection range 12 overlap with each other, and a portion of the second device projection range 12 that does not overlap with the first device projection range 11. The first system projection range 31 constitutes a first projection range having projection ranges of a plurality of projection devices (first projection device 1 and second projection device 2) provided in the projection system 100.

The projection system 100 displays a horizontally long projection target image in the first system projection range 31 by projecting a division image onto the first device projection range 11 by the first projection device 1, projecting a division image onto the second device projection range 12 by the second projection device 2, and joining these two division images. The projection target image, which is projected onto the first system projection range 31 by the first projection device 1 and the second projection device 2, constitutes a first image.

The control device 4 is a device including a control unit including various processors, a communication interface (not shown) which communicates with each unit, and a storage medium 4a such as a hard disk, a solid state drive (SSD), or a read only memory (ROM), and controls the first projection device 1, the second projection device 2, and the imaging unit 5 in an integrated manner.

Examples of the various processors of the control unit of the control device 4 include a central processing unit (CPU), which is a general-purpose processor that executes a program and performs various processing, programmable logic device (PLD), which is a processor whose circuit configuration can be changed after manufacturing, such as field programmable gate array (FPGA), or a dedicated electric circuit, which is a processor having a circuit configuration specially designed for executing specific processing such as an application specific integrated circuit (ASIC), and the like.

The structure of these various processors is, more specifically, an electric circuit in which circuit elements such as semiconductor elements are combined. The control unit of the control device 4 may be configured by one of the various processors, or may be configured by a combination of two or more processors of the same type or different types (for example, a combination of a plurality of the FPGAs or a combination of the CPU and the FPGA).

The imaging unit 5 comprises an imaging element, such as a charged coupled device (CCD) type image sensor or a metal oxide semiconductor (MOS) type image sensor which images a subject through an imaging optical system, and images at least the first system projection range 31 on the screen 6. The captured image captured by the imaging unit 5 is input to the control device 4.

Although in the projection system 100, the imaging unit 5 is provided independently, the imaging unit 5 may be built in the first projection device 1 or the second projection device 2. In addition, in the projection system 100, the imaging unit 5 may be omitted.

Figure 2:
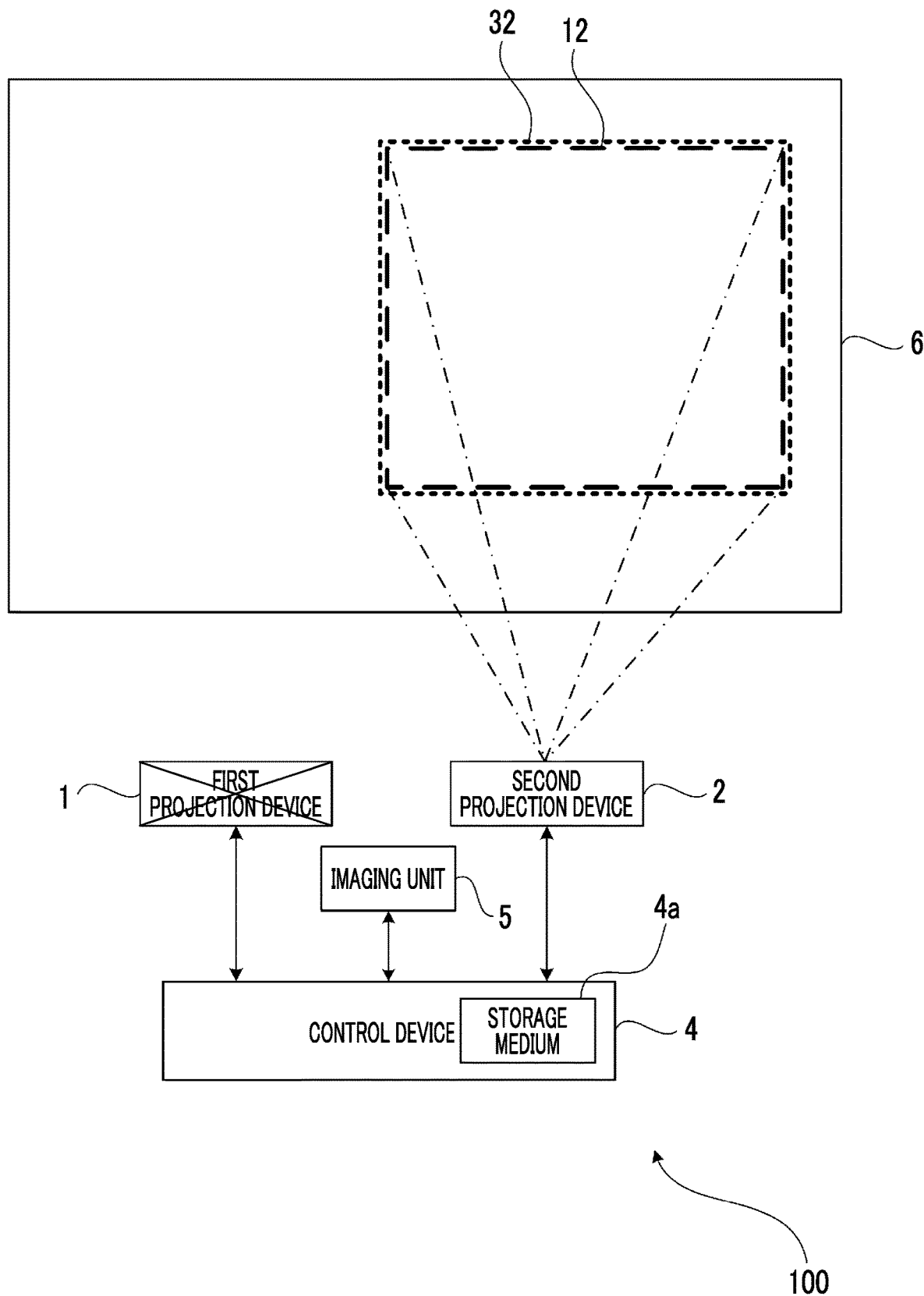
FIG. 2 is a schematic diagram showing a state in which projection is performed only by a second projection device 2.

FIG. 2 is a schematic diagram showing a state in which projection is performed only by the second projection device 2. For example, it is assumed that the first projection device 1 is in an unsteady state in which the projection onto the first device projection range 11 cannot be performed due to a failure of the first projection device 1 or the like. In this case, the control device 4 projects the image onto the second device projection range 12 by using only the second projection device 2 which can perform the projection among the first projection device 1 and the second projection device 2.

A second system projection range 32 shown in FIG. 2 is a projection range having only the second device projection range 12 of the second projection device 2. For convenience of illustration, the second system projection range 32 is shown by a broken line frame slightly larger than an actual size. The second system projection range 32 constitutes a second projection range having a projection range of a projection unit (second projection device 2) excluding a part of projection units (first projection device 1) among the projection devices provided in the projection system 100.

For example, in a case in which the control device 4 detects that the projection by the first projection device 1 is not possible, the control device 4 projects the projection target image onto the second system projection range 32 (second device projection range 12) of the screen 6 by the second projection device 2. The projection target image, which is projected onto the second system projection range 32 only by the second projection device 2, constitutes a second image.

Since the second system projection range 32 is narrower than the first system projection range 31, it is necessary that a size of the second image projected onto the second system projection range 32 is smaller than a size of the first image projected onto the first system projection range 31. Therefore, in a state in which the control device 4 is put into a state of performing projection only by the second projection device 2, the control device 4 generates the second image having a size smaller than the first image, and projects the generated second image onto the second system projection range 32 by the second projection device 2. The size is a size of the display (projection) on the screen 6.

Examples of a cause of the unsteady state in which the first projection device 1 cannot perform the projection include various causes, such as a failure or deterioration of an internal component of the first projection device 1, stop of the power supplied to the first projection device 1, a shortage of a battery residual quantity of the first projection device 1, a communication failure between the first projection device 1 and other devices (for example, control device 4), and turning-off of the power switch of the first projection device 1 by a user.

The detection by the control device 4 that the first projection device 1 cannot perform the projection can be performed, for example, based on various pieces of information, such as reception of an alarm signal output by the first projection device 1, an unreceived response signal to a signal transmitted to the first projection device 1, and an imaging result of the first device projection range 11 by the imaging unit 5.

Figure 3:
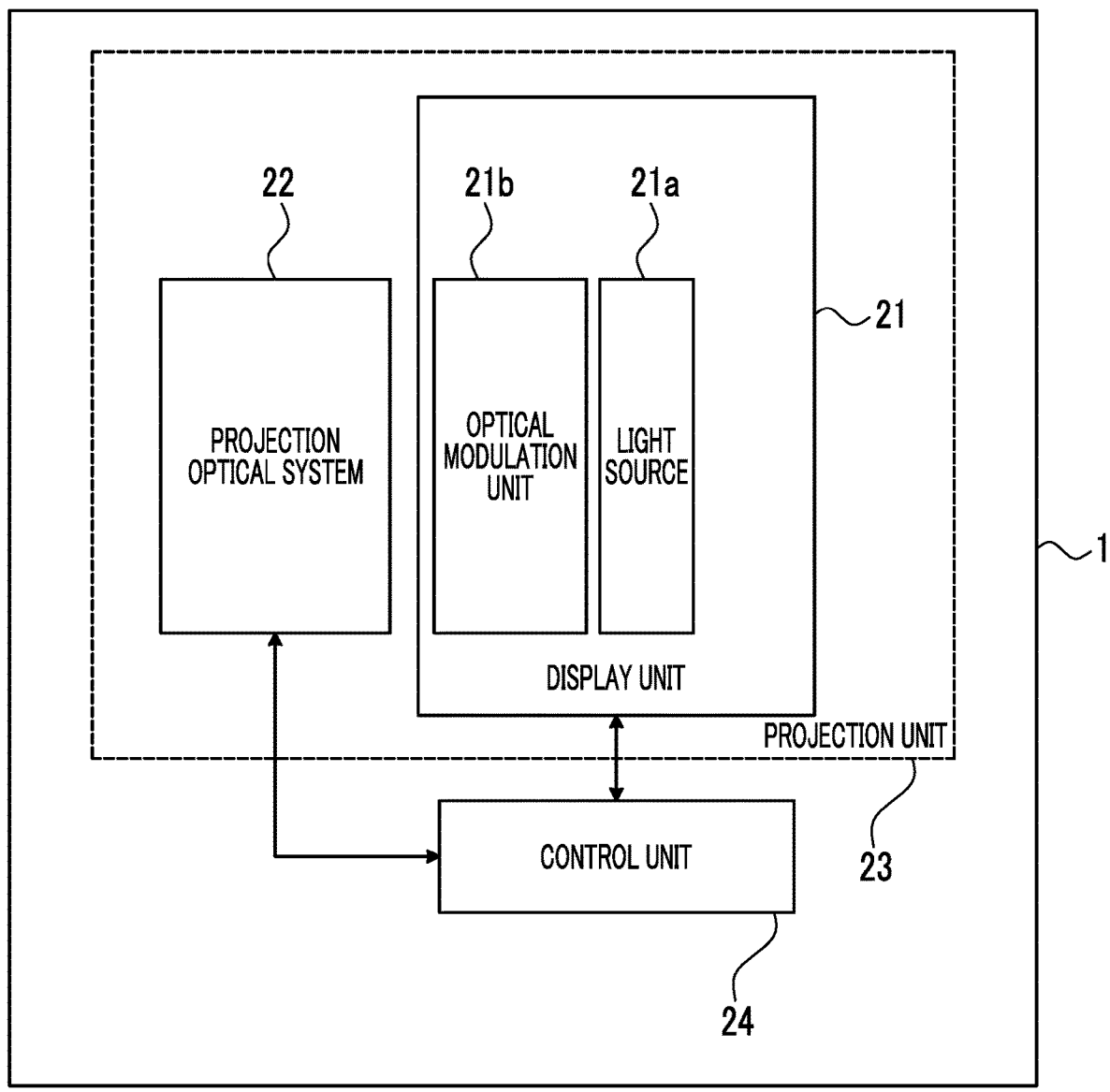
FIG. 3 is a schematic diagram showing an internal configuration of a first projection device 1 shown in FIG. 1.

FIG. 3 is a schematic diagram showing an internal configuration of the first projection device 1 shown in FIG. 1. Note that an internal configuration of the second projection device 2 shown in FIG. 1 is the same as that of the first projection device 1, and thus the description thereof will be omitted. The first projection device 1 comprises a projection unit 23 and a control unit 24.

The projection unit 23 comprises a display unit 21 including a light source 21a and an optical modulation unit 21b, and a projection optical system 22.

The light source 21a includes a light emitting element such as a laser or a light emitting diode (LED), and emits white light, for example.

The optical modulation unit 21b includes three liquid crystal panels which modulate, based on image information, each color light emitted from the light source 21a and separated into three colors of red, blue, and green by a color separation mechanism (not shown) to emit each color image. These three liquid crystal panels may be equipped with red, blue, and green filters, respectively, and modulate the white light emitted from the light source 21a by each liquid crystal panel to emit each color image.

The projection optical system 22 receives light from the display unit 21, and includes a relay optical system including at least one lens, for example. The light passing through the projection optical system 22 is projected onto the screen 6.

The control unit 24 controls the projection unit 23 based on data for display input from the control device 4 to project an image based on the data for display on the screen 6. The data for display input to the control unit 24 includes three of data for red display, data for blue display, and data for green display.

Figure 4:
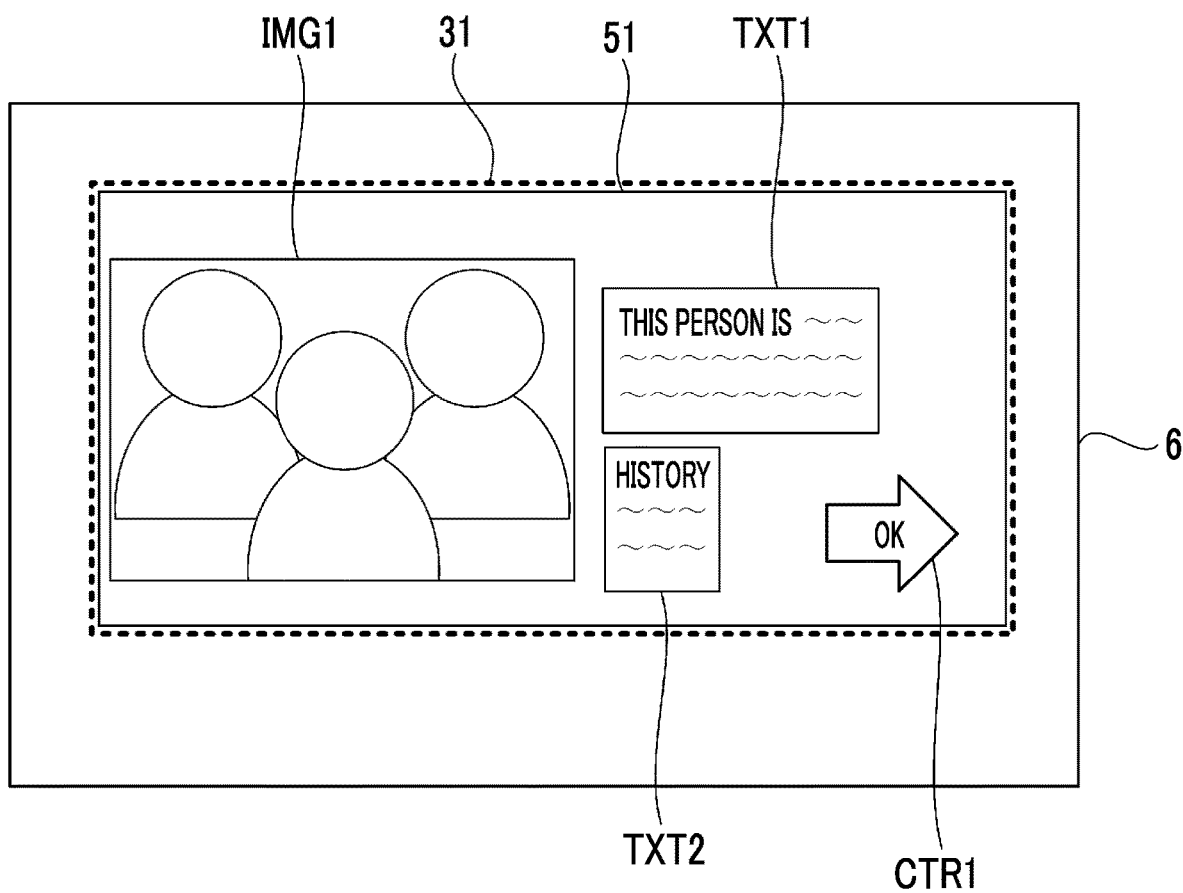
FIG. 4 is a schematic diagram showing an example of projection of a first image 51 by the first projection device 1 and the second projection device 2.

FIG. 4 is a schematic diagram showing an example of projection of the first image 51 by the first projection device 1 and the second projection device 2, In a case in which both the first projection device 1 and the second projection device 2 can perform the projection, the control device 4 projects the first image 51 onto the first system projection range 31 (first projection range) by the first projection device 1 and the second projection device 2, The first system projection range 31 is a range having the first device projection range 11 of the first projection device 1 and the second device projection range 12 of the second projection device 2, as shown in FIG. 1.

The first image 51 is an image having the same shape and size as the first system projection range 31, for example. As a result, the entire first image 51 can be projected in a large size by using the first system projection range 31 without waste. In the first image 51, an image content IMG1, a text content TXT1, a text content TXT2, and an operating part CTR1 are disposed as contents.

The image content IMG1 is, for example, image data drawn based on image data, such as a bitmap image or a vector image. In the example shown in FIG. 4, the image content IMG1 is a bitmap image obtained by imaging three people.

The text contents TXT1 and TXT2 are character data drawn based on a text file including a character code, such as plain text or rich text. In the example shown in FIG. 4, each of the text contents TXT1 and TXT2 is a character string describing a person appearing in the image content IMG1. The text content TXT1 is a character string starting with "this person is". The text content TXT2 is a character string starting with "history".

The operating part CTR1 is an operating part that indicates a region for receiving an instruction from the user. In the example shown in FIG. 4, the operating part CTR1 has a character "OK", and is a button for giving an instruction for the transition to the next screen.

For example, it is assumed that the control device 4 displays information in a slide show format, and the first image 51 is one slide included in the slide show. In this case, in a case in which the user indicates the region of the operating part CTR1 with a pointer or the like, the control device 4 projects the next slide of the first image 51 onto the first system projection range 31 instead of the first image 51.

The drawing of the first image 51 will be described. For example, drawing data for projecting the first image 51 is stored in the storage medium 4a shown in FIG. 1. This drawing data includes the image content IMG1, the text content TXT1, the text content TXT2, and the operating part CTR1. In addition, this drawing data includes disposition information indicating the disposition (position or size) of these contents.

The control device 4 reads out the drawing data from the storage medium 4a, and generates the first image 51 in which each content included in the drawing data is disposed based on the disposition information included in the drawing data. Moreover, the control device 4 projects the generated first image 51 onto the first system projection range 31 by the first projection device 1 and the second projection device 2.

Figure 5:
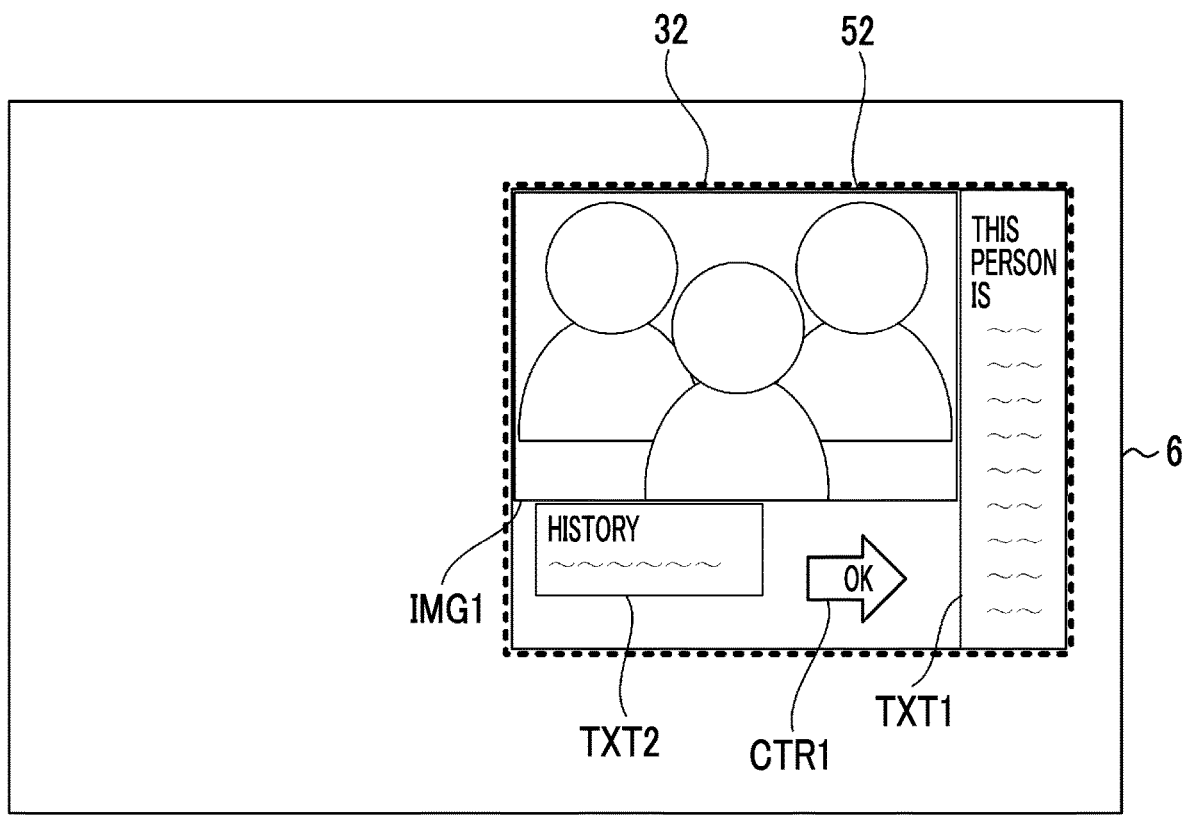
FIG. 5 is a schematic diagram showing an example of projection of a second image 52 only by the second projection device 2.

FIG. 5 is a schematic diagram showing an example of projection of the second image 52 only by the second projection device 2. For example, in a state in which the projection by the first projection device 1 onto the first device projection range 11 is not possible and the projection is performed only by the second projection device 2 due to the failure of the first projection device 1 or the like, the control device 4 projects the second image 52 onto the second system projection range 32 (second projection range)

by the second projection device 2. The second system projection range 32 is a range having only the second device projection range 12 of the second projection device 2, as shown in FIG. 2.

The second image 52 is an image in which at least a part of the contents included in the first image 51 is disposed. In the example shown in FIG. 5, in the second image 52, all of the contents included in the first image 51, that is, the image content IMG1, the text contents TXT1 and TXT2, and the operating part CTR1 are disposed. However, in a case in which it is difficult to dispose all of these contents in the second image 52, a part of these contents may not be disposed in the second image 52.

The second system projection range 32 onto which the second image 52 is projected is narrower than the first system projection range 31 onto which the first image 51 is projected. Therefore, the control device 4 generates the second image 52 of which the size fits in the second system projection range 32.

In this case, it is assumed that the first image 51 is reduced with a fixed aspect ratio in order to generate the second image 52 that fits in the second system projection range 32. In this case, since the first image 51 having the same shape and size as the first system projection range 31 has a different aspect ratio with respect to the second system projection range 32, the second image 52 is generated by reducing the first image 51 such that a length (horizontal width) of a long side of the first image 51 fits in the horizontal width of the second system projection range 32. Therefore, the size of the second image 52 is reduced, the visibility of the second image 52 is decreased, and there is a region of the second system projection range 32 onto which the image is not projected.

In addition, in order to generate the second image 52 that fits in the second system projection range 32, the first image 51 is reduced while changing the aspect ratio of the first image 51 to match the aspect ratio of the second system projection range 32. In this case, there is no region of the second system projection range 32 onto which the second image 52 is not projected, but the aspect ratio is also changed for the content for which it is not desirable to change the aspect ratio, such as the image content IMG1 included in the first image 51.

On the other hand, the control device 4 according to the present embodiment generates the second image 52 in which at least a part of the contents included in the first image 51 is disposed again based on the drawing data for projecting the first image 51. In this case, the control device 4 acquires, for each of the contents included in the first image 51, first attribute information (for example, Keep_aspect, which will be described below) indicating whether the aspect ratio is made to be changeable in a case in which the size of the content is adjusted or the aspect ratio is maintained in a case in which the size of the content is adjusted.

Moreover, the control device 4 disposes each content on the second image 52 based on the acquired first attribute information in a case in which the second image 52 is generated. For example, the first attribute information of the image content IMG1 indicates that the aspect ratio is maintained in a case in which the size of the image content IMG1 is adjusted. In addition, the first attribute information each of the text contents TXT1 and TXT2, and the operating part CTR1 indicates that the aspect ratio is made to be changeable in a case in which the size of each content is adjusted.

In this case, for example, as shown in FIG. 5, the control device 4 generates the second image 52 in which the image content IMG1 of which the size is adjusted while maintaining the aspect ratio, the text contents TXT1 and TXT2 of which the size is adjusted such that the aspect ratio is changeable, and the operating part CTR1 are disposed.

As a result, the image content IMG1 can be disposed in the second image 52 by adjusting the size of the image content IMG1 for which it is not desirable to change the aspect ratio while maintaining the aspect ratio. In addition, for the text contents TXT1 and TXT2, and the operating part CTR1 which have little influence even in a case in which the aspect ratio is changed, these contents can be flexibly disposed in an empty region of the second system projection range 32 by adjusting the size such that the aspect ratio is changeable and disposing the second image 52.

FIG. 6 is a schematic diagram showing another example of the projection of the second image 52 only by the second projection device 2. For example, in a state in which the projection by the first projection device 1 onto the first device projection range 11 is not possible and the projection is performed only by the second projection device 2 due to the failure of the first projection device 1 or the like, the control device 4 may switch between a projection state 61 and a projection state 62 by the second projection device 2 at regular time intervals.

The projection state 61 is a state in which the second image 52 in which the image content IMG1, the text content TXT1, and the operating part CTR1 are disposed is projected. That is, the text content TXT2 is not included in the second image 52 in the projection state 61.

The projection state 62 is a state in which the second image 52 in which the image content IMG1, the text content TXT2, and the operating part CTR1 are disposed is projected. That is, the text content TXT1 is not included in the second image 52 in the projection state 62.

In addition, the projection region of the text content TXT1 in the projection state 61 and the projection region of the text content TXT2 in the projection state 62 overlap with each other. That is, the control device 4 alternately projects the text content TXT1 and the text content TXT2 onto a part of the region of the second image 52 while projecting the second image 52.

For example, the control device 4 acquires, for each of the contents included in the first image 51, second attribute information (for example, Always_disp, which will be described below) indicating whether the content is always projected in a state in which the projection by the partial projection device in the projection system 100 is not possible or the content is alternately projected with other contents in a state in which the projection by the partial projection device in the projection system 100 is not possible.

Moreover, the control device 4 disposes each content on the second image 52 based on the acquired second attribute information in a case in which the second image 52 is generated. For example, the second attribute information of each of the image content IMG1 and the operating part CTR1 indicates that the content is always displayed in a state in which the projection by the partial projection device in the projection system 100 is not possible. In addition, the second attribute information of each of the text contents TXT1 and TXT2 indicates that the content is alternately projected with other contents in a state in which the projection by the partial projection device in the projection system 100 is not possible.

In this case, for example, as shown in FIG. 6, the control device 4 generates the second image 52 in which the image content IMG1 and the operating part CTR1 are disposed not to overlap with other contents, and the text contents TXT1 and TXT2 are disposed at positions overlapping with each other. Moreover, in a case in which the second image 52 is projected, the control device 4 switches between the projection state 61 in which the text content TXT1 is projected and the text content TXT2 is not projected, and the projection state 62 in which the text content TXT2 is projected and the text content TXT1 is not projected, at regular time intervals.

As a result, the image content IMG1 and the operating part CTR1 can be always projected, and the text contents TXT1 and TXT2 can be temporally alternately projected with each other. Moreover, since the text contents TXT1 and TXT2 are disposed at positions overlapping with each other, it is possible to dispose and project each content in a larger size.

Figure 7:
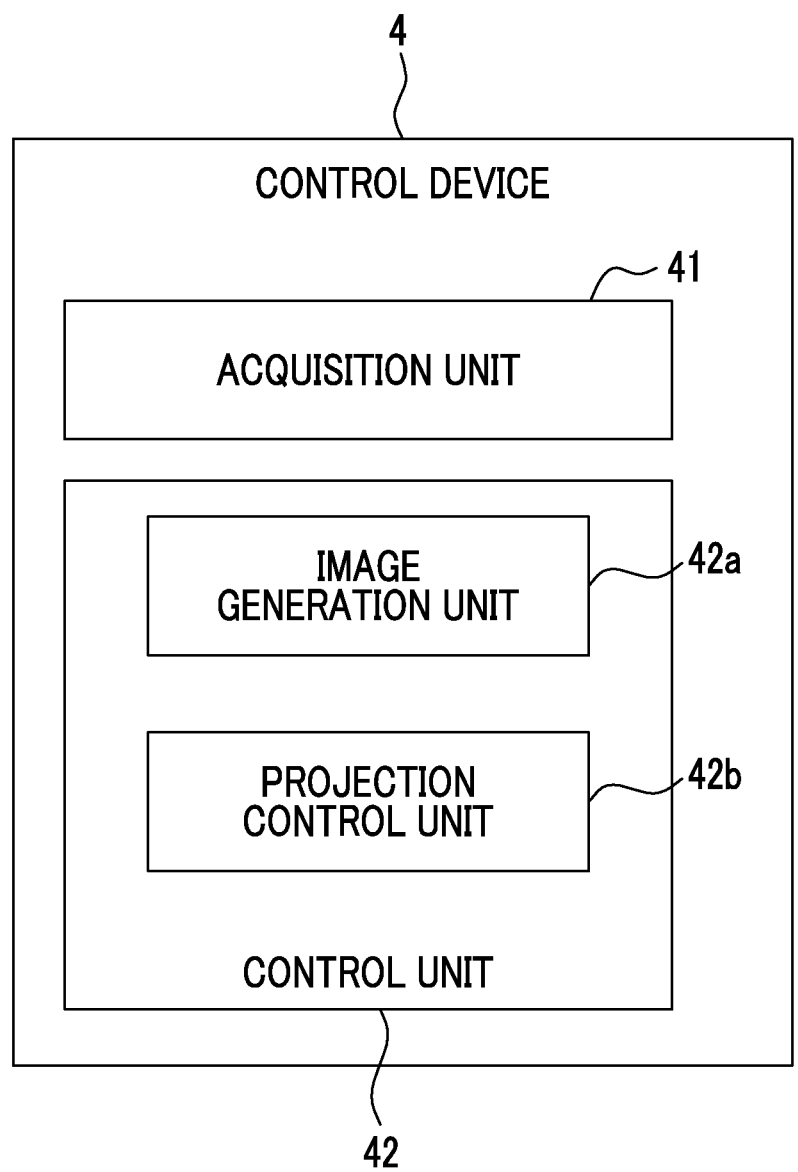
FIG. 7 is a diagram showing an example of a functional block of a control device 4.

FIG. 7 is a diagram showing an example of a functional block of the control device 4. As shown in FIG. 7, the control device 4 comprises an acquisition unit 41 and a control unit 42. The acquisition unit 41 acquires the first attribute information and second attribute information described above for each content of the first image 51.

Further, the acquisition unit 41 may acquire third attribute information or a data type indicating the priority for each content of the first image 51. The priority of the content is information indicating a degree of preferentially displaying the content as compared with other contents. Preferentially displaying the content may mean that other contents are preferentially reduced over the content, a reduction width of the content may be smaller than those of the other contents, or both of these.

Each attribute information is stored, for example, in the storage medium 4a in association with each content, and the control device 4 acquires each attribute information from the storage medium 4a. Alternatively, each attribute information is stored in an external device of the control device 4 in association with each content, and the control device 4 may acquire each attribute information from the external device using a communication interface.

The acquisition of each attribute information by the acquisition unit 41 need only be performed before the generation of the second image 52 described above. For example, the acquisition unit 41 may acquire each attribute information in a case in which the first image 51 is projected onto the first system projection range 31 without any failure of the projection device or the like, or the acquisition unit 41 may acquire each attribute information after the failure of the projection device or the like occurs.

The control unit 42 controls the projection by each projection device included in the projection system 100. Specifically, the control unit 42 comprises an image generation unit 42a and a projection control unit 42b. The image generation unit 42a performs generation of the first image 51 or the second image 52 described above. In addition, the image generation unit 42a uses each attribute information acquired by the acquisition unit 41 in the generation of the second image 52.

The projection control unit 42b projects the first image 51 or the second image 52 generated by the image generation unit 42a on the screen 6 by controlling the projection device that can perform the projection among the first projection device 1 and the second projection device 2.

FIG. 8 is a diagram showing an example of the attribute information of the content acquired by the acquisition unit 41 shown in FIG. 7. The acquisition unit 41 shown in FIG. 7 acquires, for example, an attribute information table 80 for each content of the first image 51. The attribute information table 80 is information indicating Keep_aspect, Always_disp, Type, Min_Size_rate, and Priority for each of the image content IMG1, the text contents TXT1 and TXT2, and the operating part CTR1 of the first image 51.

Keep_aspect is the first attribute information described above, and indicates whether or not the aspect ratio is maintained in a case in which the size of the content is adjusted. Keep_aspect=1 indicates that the aspect ratio is maintained in a case in which the size of the content is adjusted, and Keep_aspect=0 indicates that the aspect ratio is made to be changeable in a case in which the size of the content is adjusted.

Always_disp is the second attribute information described above, and indicates whether or not the content is always projected in a state in which the projection by the partial projection device cannot be performed. Always_disp=1 indicates that projection is always performed in a state in which projection by the partial projection device is not possible, and Always_disp=0 indicates that the content is alternately projected with other contents in a state in which projection by the partial projection device is not possible.

Type is attribute information indicating the data type of the content. For example, Type of the image content IMG1 is a "picture" indicating that it is the image data. Each Type of the text contents TXT1 and TXT2 is "text" indicating that it is the character data. Type of the operating part CTR1 is "control" indicating that it is the operating part.

Min_Size_rate is attribute information indicating a rate of the adjusted size to the original content (minimum size rate), which is desirable to be maintained in a case in which the size of the content is adjusted. For example, in a case in which the size of the content is adjusted with Min_Size_rate=30%, it is desirable that the adjusted size does not fall below 30% of the size before the adjustment.

Priority is the third attribute information indicating the priority of displaying the content. For example, in a case in which the image content IMG1, the text contents TXT1 and TXT2, and the operating part CTR1 are disposed in the second image 52, it is necessary to reduce at least any one of the contents, but the content having lower Priority among these contents is preferentially reduced.

Figure 9:
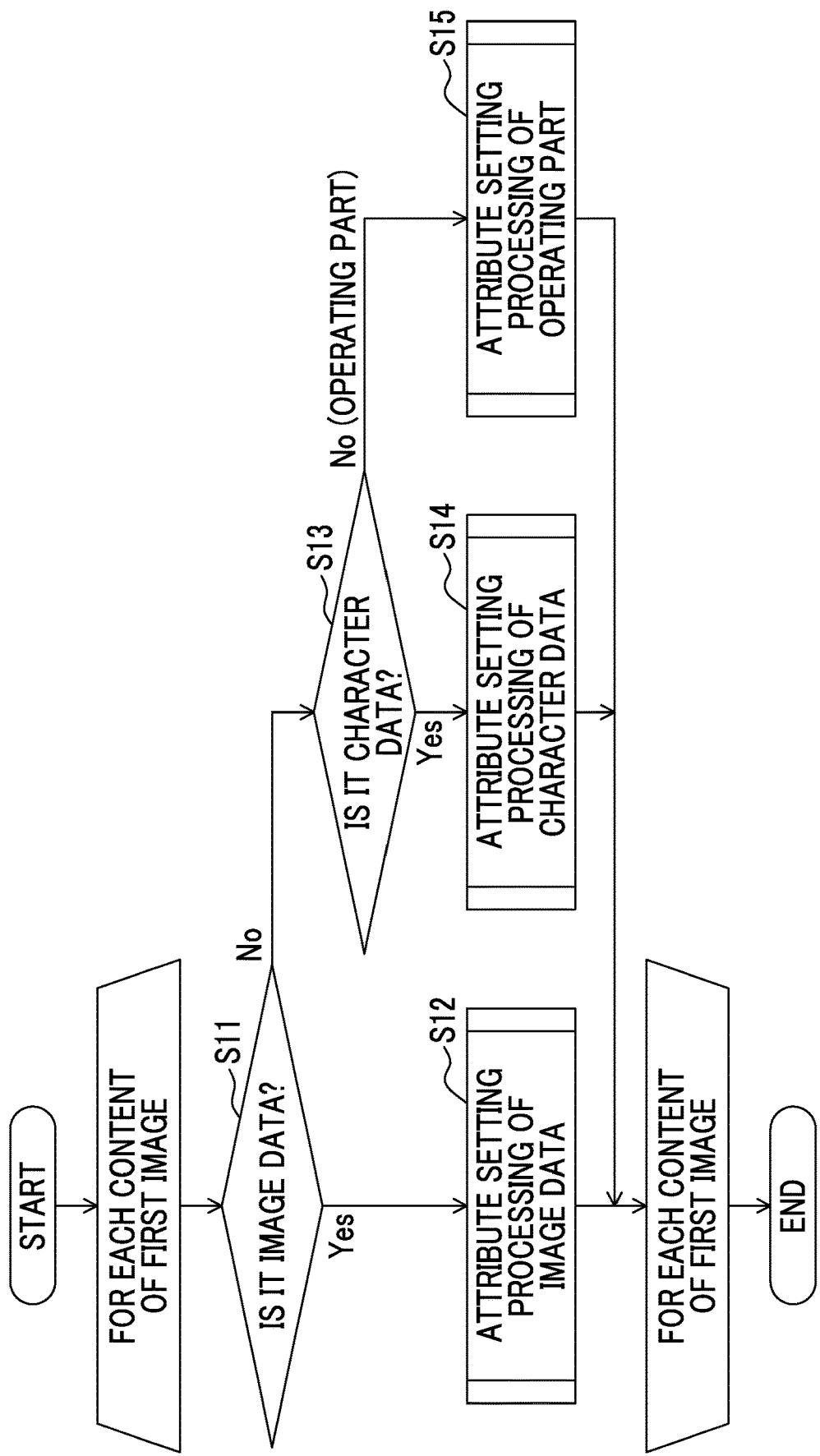
FIG. 9 is a flowchart showing an example of attribute information setting processing by the control device 4.

FIG. 9 is a flowchart showing an example of attribute information setting processing by the control device 4. The control device 4 executes, for example, the processing shown in FIG. 9 as the attribute information setting processing of setting the attribute information of each content of the first image 51. Specifically, the control device 4 executes the processing as follows for each content of the first image 51.

First, the control device 4 determines whether or not a target content is the image data (step S11). Here, the image data is not limited to still picture data, but may include motion picture data. In a case in which the target content is the image data (step S11: Yes), the control device 4 executes the attribute setting processing of the image data for the target content (step S12), and terminates the processing for the target content. The attribute setting processing of the image data in step S12 will be described with reference to FIG. 10.

In step S11, in a case in which the target content is not the image data (step S11: No), the control device 4 determines whether or not the target content is the character data (step S13). In a case in which the target content is the character data (step S13: Yes), the control device 4 executes the attribute setting processing of the character data for the target content (step S14), and terminates the processing for the target content. The attribute setting processing of the character data in step S14 will be described with reference to FIG. 11.

In step S13, in a case in which the target content is not the character data (step S13: No), the target content is the operating part. In this case, the control device 4 executes the attribute setting processing of the operating part for the target content (step S15), and terminates the processing for the target content. The attribute setting processing of the operating part in step S15 will be described with reference to FIG. 12.

Note that there are data types other than the image data, the character data, and the operating part as the data type of the content, a conditional branch is further added and the attribute setting processing is executed depending on the data type of the content.

The processing shown in FIG. 9 is executed, for example, at any point in time from the acquisition of the drawing data of the first image 51 by the control device 4 to the start of the projection of the second image 52 by the control device 4 in a state in which the partial projection device cannot perform the projection. For example, the processing shown in FIG. 9 may be executed triggered by the failure of the partial projection device in the projection system 100, or may be executed before the failure of the partial projection device in the projection system 100 occurs.

Each attribute information set by the processing shown in FIG. 9 (for example, the attribute information table 80 shown in FIG. 8) is stored in, for example, the storage medium 4a. In this case, the acquisition unit 41 shown in FIG. 7 acquires each attribute information stored in the storage medium 4a.

Figure 10:
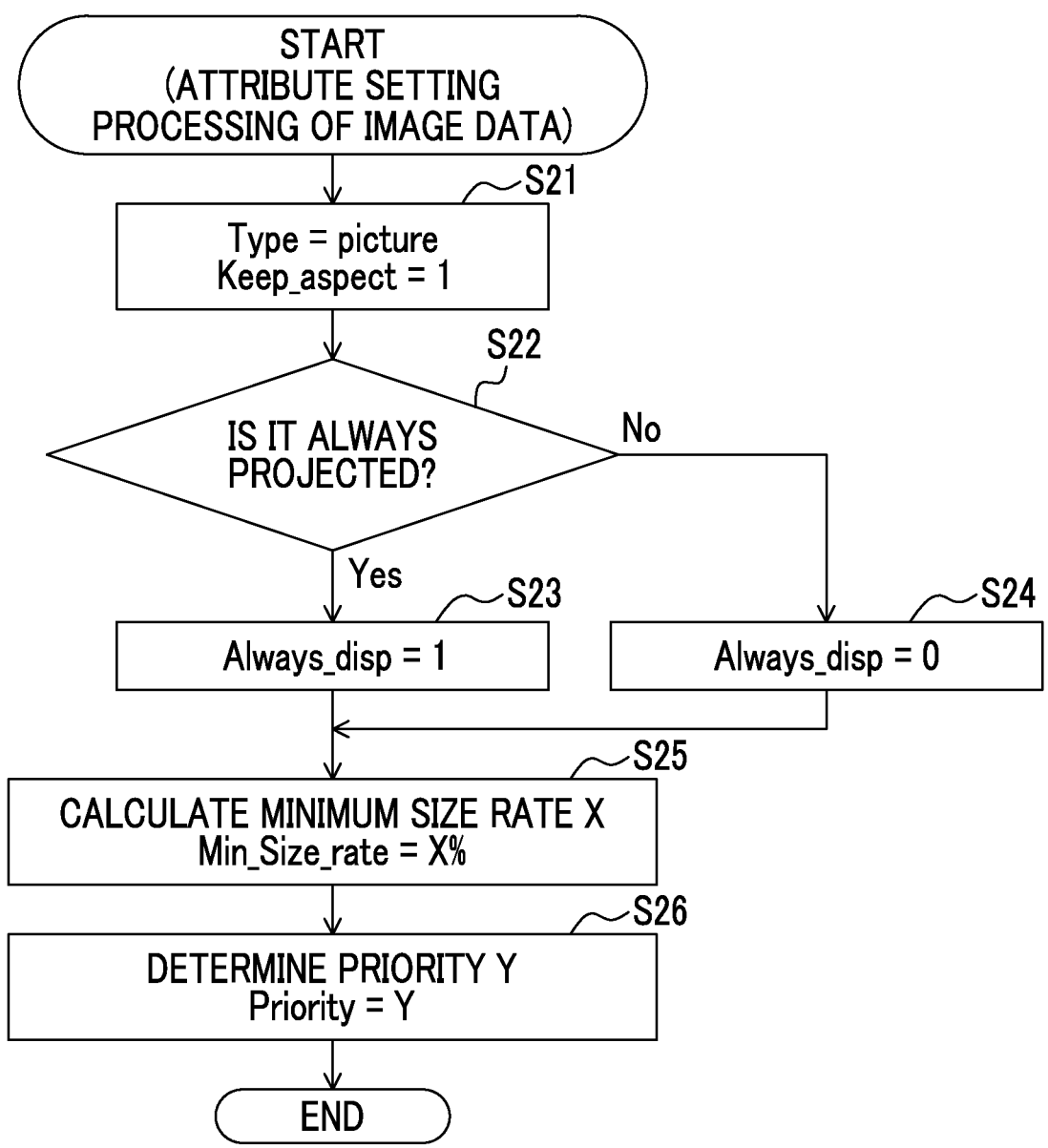
FIG. 10 is a flowchart showing an example of attribute setting processing of image data shown in FIG. 9.

FIG. 10 is a flowchart showing an example of attribute setting processing of the image data shown in FIG. 9. As the attribute setting processing of the image data in step S12 shown in FIG. 9, the control device 4 executes, for example, the processing shown in FIG. 10. First, the control device 4 sets Type of the target content to "picture" and Keep_aspect of the target content to "1" (step S21). As described above, it is generally desirable to maintain the aspect ratio of the image data, and thus Keep_aspect is set to "1".

Next, the control device 4 determines whether or not the target content is always projected (step S22). The determination in step S22 can be made based on various criteria, such as whether or not the target content is a motion picture, or whether or not the target content is a specific content that needs to reflect an interactive operation. As an example, it can be determined that the target content is always projected in a case in which the target content is the motion picture, and the target content is not always projected in a case in which the target content is a still picture.

In a case in which it is determined in step S22 that the target content is always projected (step S22: Yes), the control device 4 sets Always_disp of the target content to "1" (step S23). In a case in which it is determined that the target content is not always projected (step S22: No), the control device 4 sets Always_disp of the target content to "0" (step S24).

Next, the control device 4 calculates a minimum size rate X in a case in which the size of the target content is adjusted, and sets the calculated minimum size rate X to Min_Size_rate of the target content (step S25). For example, the calculation of the minimum size rate X can be performed based on various criteria, such as the number of pixels of the target content.

Next, the control device 4 determines priority Y of the display of the target content, sets the determined priority Y to Priority of the target content (step S26), and terminates the attribute setting processing for the target content. For example, the determination of the priority Y in step S26 can be made based on various criteria, such as a ratio of an area occupied by the target content in the first image 51. As an example, the content having a larger ratio of the area in the first image 51 is more likely to be important content, so that the priority Y is set higher.

Note that an order of setting each attribute information shown in FIG. 10 may be changed as appropriate.

Figure 11:
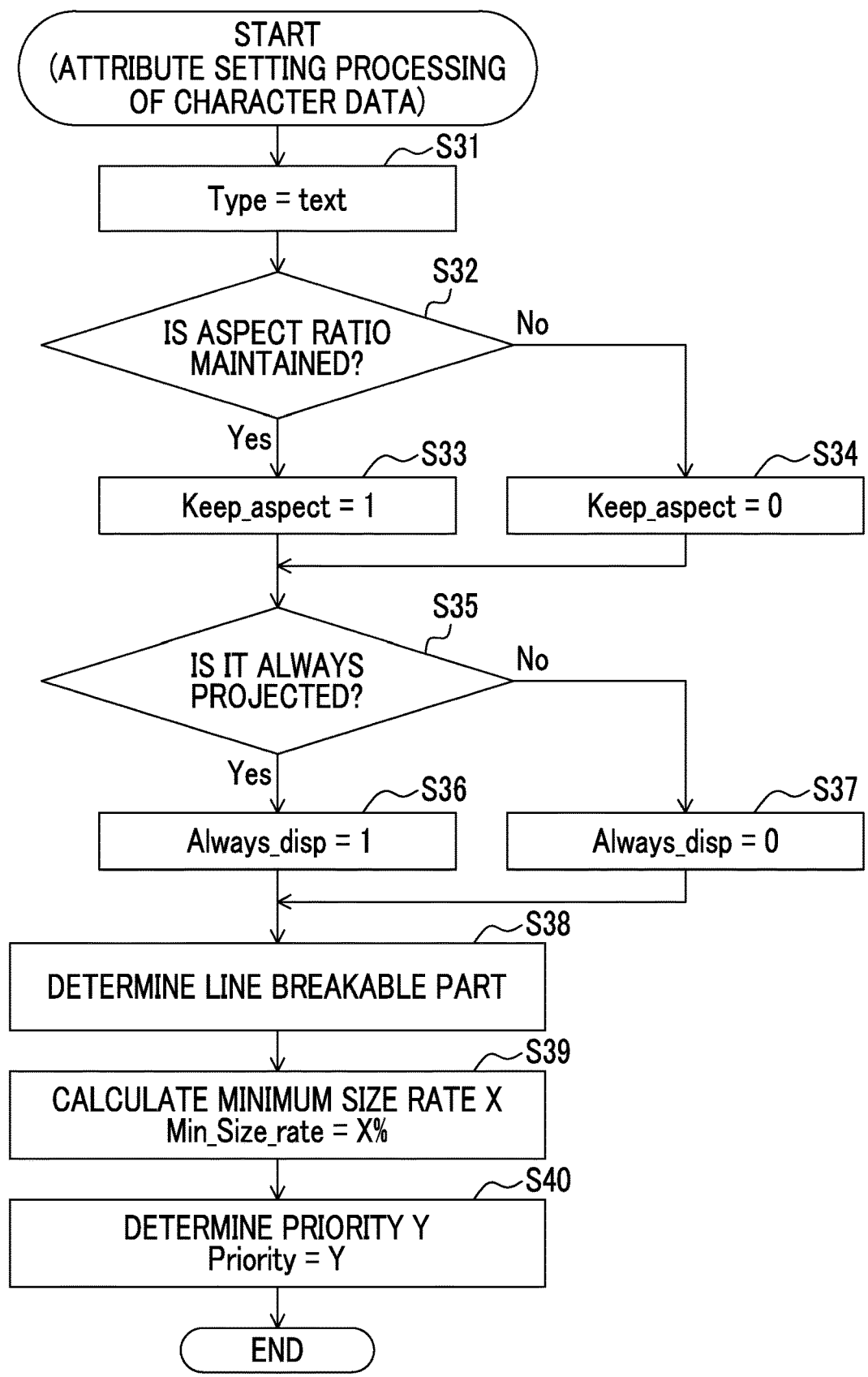
FIG. 11 is a flowchart showing an example of attribute setting processing of character data shown in FIG. 9.

FIG. 11 is a flowchart showing an example of attribute setting processing of the character data shown in FIG. 9. As the attribute setting processing of the character data in step S14 shown in FIG. 9, the control device 4 executes, for example, the processing shown in FIG. 11. First, the control device 4 sets Type of the target content to "text" (step S31).

Next, the control device 4 determines whether or not the aspect ratio is maintained in a case in which the size of the target content is adjusted (step S32). The determination in step S32 can be made based on various criteria, such as whether or not a font size is used properly in the target content which is the character data, or whether or not the character disposition, such as centering, is used properly. As an example, for content of which the font size is used properly, the layout of the character string is likely to be important, so that it is determined that the aspect ratio is maintained in a case in which the size is adjusted, and for content of which the font size is not used properly, the layout of the character string is likely not to be important, so that it is determined that the aspect ratio is not maintained in a case in which the size is adjusted.

In a case in which it is determined in step S32 that the aspect ratio is maintained in a case in which the size of the target content is adjusted (step S32: Yes), the control device 4 sets Keep_aspect of the target content to "1" (step S33). In a case in which it is determined that the aspect ratio is not maintained in a case in which the size of the target content is adjusted (step S32: No), the control device 4 sets Keep_aspect of the target content to "0" (step S34).

Next, the control device 4 determines whether or not the target content is always projected (step S35). The determination in step S35 can be made based on various criteria, such as whether or not a display content of the target content is temporally changed, or whether or not the target content is a specific content that needs to reflect an interactive operation. As an example, in a case in which the display content of the target content is temporally changed, it can be determined that the projection is always performed, and in a case in which the display content of the target content is not temporally changed, it can be determined that the projection is not always performed.

In a case in which it is determined in step S35 that the target content is always projected (step S35: Yes), the control device 4 sets Always_disp of the target content to "1" (step S36). In a case in which it is determined that the target content is not always projected (step S35: No), the control device 4 sets Always_disp of the target content to "0" (step S37).

Next, the control device 4 extracts a line breakable part in the target content which is the character data (step S38). In step S38, for example, immediately after a punctuation mark in the character data can be extracted as the line breakable part.

Next, the control device 4 executes steps S39 and S40, and terminates the attribute setting processing for the target content. Steps S39 and S40 are the same as steps S25 and S26 shown in FIG. 10.

Note that an order of setting each attribute information shown in FIG. 11 may be changed as appropriate.

Figure 12:
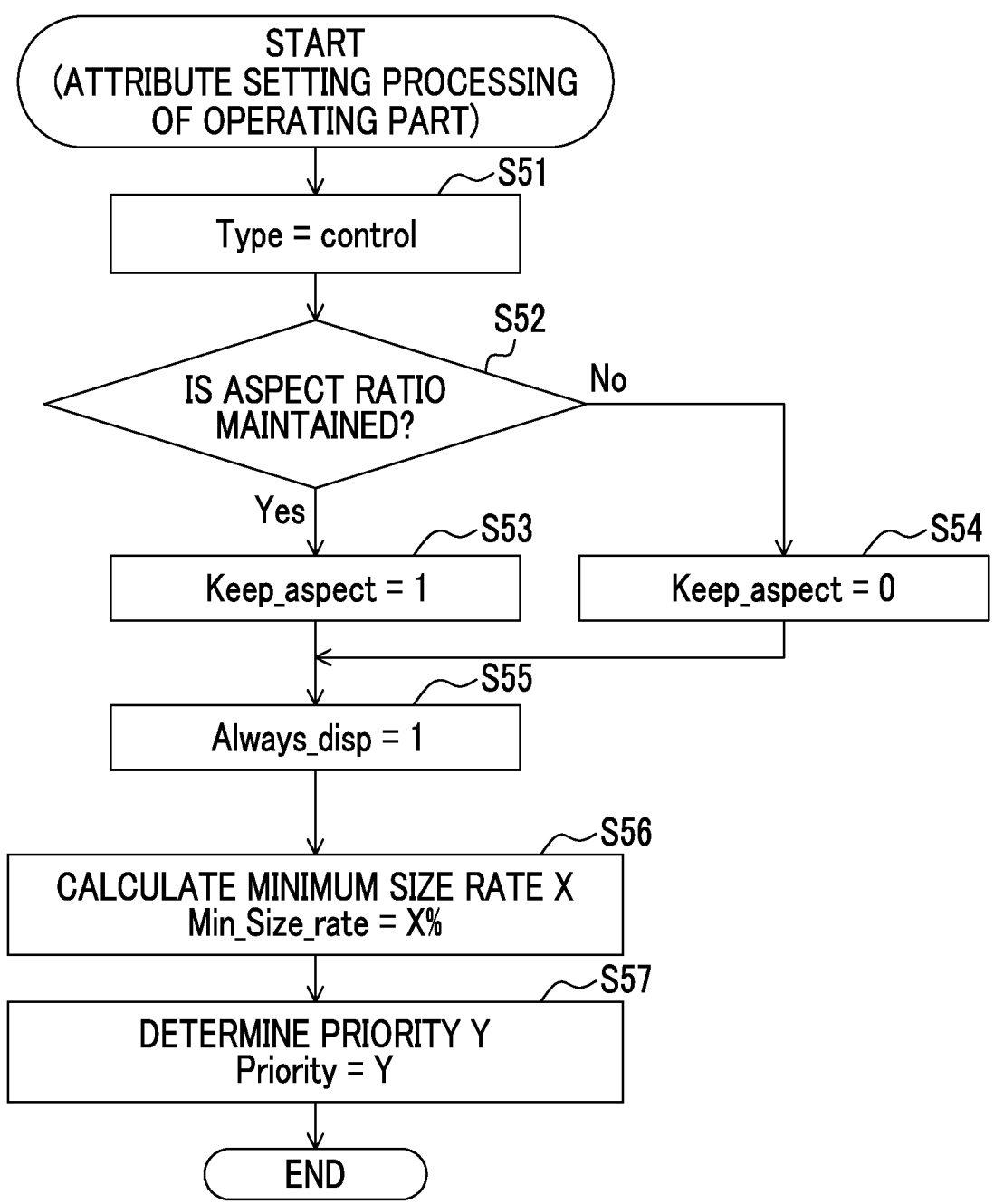
FIG. 12 is a flowchart showing an example of attribute setting processing of an operating part shown in FIG. 9.

FIG. 12 is a flowchart showing an example of attribute setting processing of the operating part shown in FIG. 9. As the attribute setting processing of the operating part in step S15 shown in FIG. 9, the control device 4 executes, for example, the processing shown in FIG. 12. First, the control device 4 sets Type of the target content to "control" (step S51).

Next, the control device 4 determines whether or not the aspect ratio is maintained in a case in which the size of the target content is adjusted (step S52). The determination in step S52 can be made based on various criteria that can determine the importance of the aspect ratio, such as whether or not the operating part which is the target content is a gauge type (for example, a circular gauge type) operating part.

In a case in Which it is determined in step S52 that the aspect ratio is maintained in a case in which the size of the target content is adjusted (step S52: Yes), the control device 4 sets Keep_aspect of the target content to "1" (step S53). In a case in which it is determined that the aspect ratio is not maintained in a case in which the size of the target content is adjusted (step S52: No), the control device 4 sets Keep_aspect of the target content to "0" (step S54).

Next, the control device 4 sets Always_disp of the target content to "1" (step S55). As described above, it is generally desirable to always project the operating part, and thus Always_disp is set to "1".

Next, the control device 4 executes steps S56 and S57, and terminates the attribute setting processing for the target content. Steps S56 and S57 are the same as steps S25 and S26 shown in FIG. 10.

Note that an order of setting each attribute information shown in FIG. 12 may be changed as appropriate.

In FIGS. 9 to 12, the method of setting the attribute information of each content in the first image 51 has been described, but the method of setting the attribute information of each content in the first image 51 may be optionally determined by the user of the projection system 100. In addition, at least any one of the attribute information of each content in the first image 51 may be set in advance, for example, by a creator of the first image 51.

Figure 13:
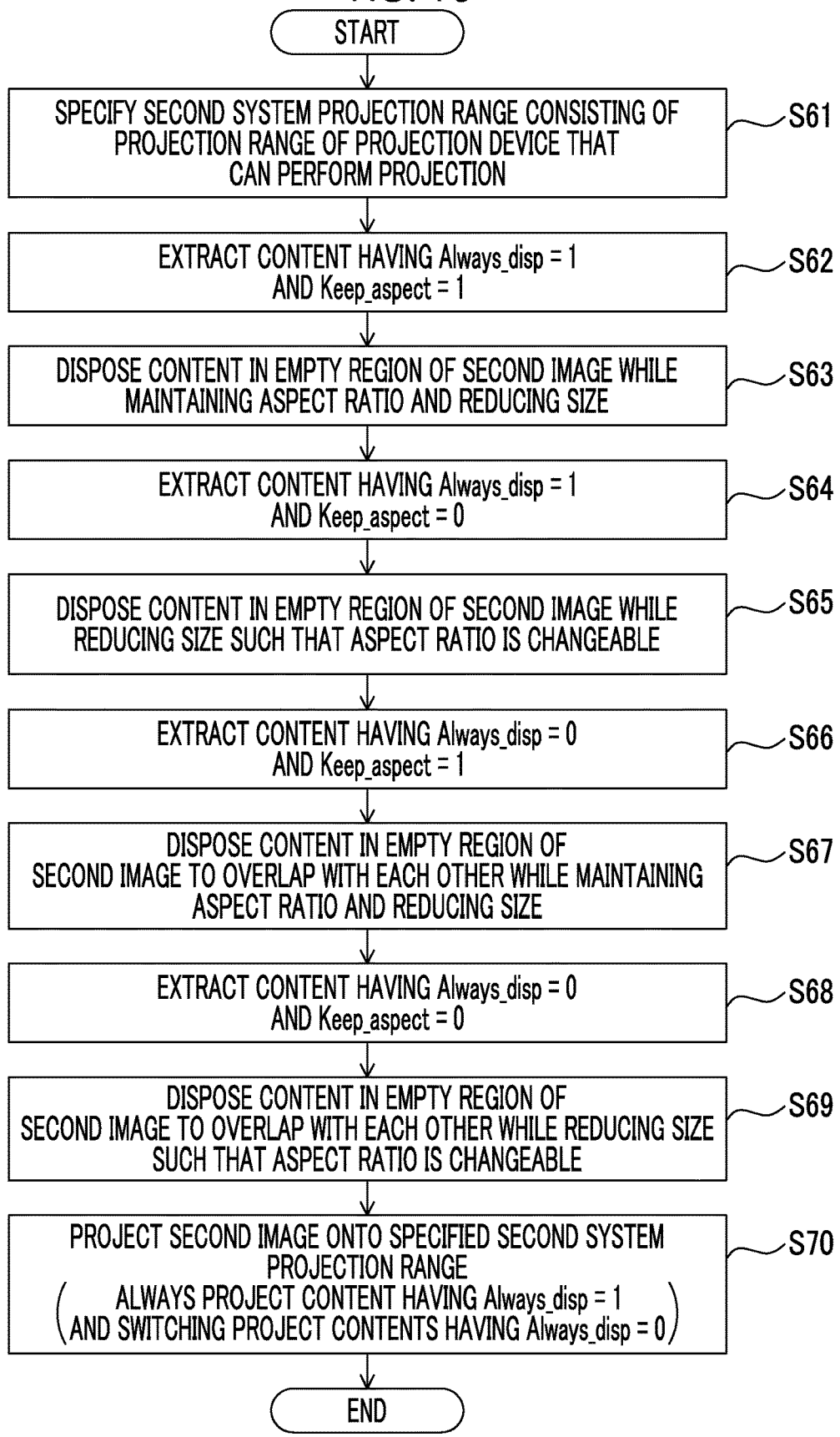
FIG. 13 is a flowchart showing an example of projection control processing of the second image 52 by the control device 4.

FIG. 13 is a flowchart showing an example of projection control processing of the second image 52 by the control device 4. In a case in which the drawing data of the first image 51 is set as the drawing data of the projection target, the control device 4 executes, for example, the projection control processing shown in FIG. 13 in a case in which the projection by the partial projection device among the first projection device 1 and the second projection device 2 cannot be performed. Here, it is assumed that projection by the first projection device 1 cannot be performed due to the failure of the first projection device 1 or the like.

First, the control device 4 specifies the second system projection range 32 having the second device projection range 12 of the second projection device 2 that can perform the projection (step S61). In addition, the control device 4 generates the empty second image 52 having the same shape and size as the specified second system projection range 32. That is, in the second image 52 at this point in time, all of the regions are empty regions.

Next, the control device 4 extracts the content having Always_disp of "1" and Keep_aspect of "1" from each content of the first image 51 (step S62). For example, in the example shown in FIG. 8, the image content IMG1 is extracted in step S62.

Next, the control device 4 disposes the content extracted in step S62 in the empty region of the second image 52 while maintaining the aspect ratio and reducing the content (step S63). The content is reduced such that the rate of the reduced size to the size before reduction does not fall below Min_Size_rate of the content.

In a case in which a plurality of contents are extracted in step S62, the control device 4 refers to Type of each content and disposes the content of the image data, the content of the character data, and the content of the operating part in this order. As described above, the control device 4 disposes each content on the second image 52 in a priority order depending on the data type of each content.

In addition, in a case in which a plurality of contents having the same Type are extracted in step S62, the control device 4 preferentially reduces the content having lower Priority, for the plurality of contents having the same Type. As described above, the control device 4 adjusts the size based on the priority of each content.

In addition, in a case in which the empty region of the second image 52 is insufficient and the content extracted in step S62 cannot be disposed in the second image 52 while maintaining Min_Size_rate, the control device 4 reduces the content extracted in step S62 without maintaining Min_Size_rate until it can be disposed in the second image 52. In this case, the control device 4 preferentially reduces the content having lower Priority.

Next, the control device 4 extracts the content having Always_disp of "1" and Keep_aspect of "0" from each content of the first image 51 (step S64). For example, in the example shown in FIG. 8, the operating part CTR1 is extracted in step S64.

Next, the control device 4 disposes the content extracted in step S64 in the empty region of the second image 52 while reducing the content such that the aspect ratio is changeable (step S65). The disposition of the content in step S65 is the same as the disposition of the content in step S63, except that the aspect ratio is changeable.

Next, the control device 4 extracts the content having Always_disp of "0" and Keep_aspect of "1" from each content of the first image 51 (step S66). For example, in the example shown in FIG. 8, the content is not extracted in step S66.

Next, the control device 4 disposes the content extracted in step S66 in the empty region of the second image 52 to overlap with each other while maintaining the aspect ratio and reducing the content (step S67). The disposition of the contents in step S67 is the same as the disposition of the contents in step S63, except that the content and the empty region can overlap with each other.

Next, the control device 4 extracts the content having Always_disp of "0" and Keep_aspect of "0" from each content of the first image 51 (step S68). For example, in the example shown in FIG. 8, the text contents TXT1 and TXT2 are extracted in step S68.

Next, the control device 4 disposes the content extracted in step S68 in the empty region of the second image 52 to overlap with each other while reducing the content such that the aspect ratio is changeable (step S69). The disposition of the contents in step S69 is the same as the disposition of the contents in step S65, except that the content and the empty region can overlap with each other. Note that the content disposed in step S69 may be disposed to overlap with the content disposed in step S67 (Always_disp is "0").

Next, the control device 4 projects the second image 52 in which each content is disposed onto the second system projection range 32 specified in step S61 (step S70), and terminates the series of the projection control processing. In step S70, the control device 4 always projects the content of which Always_disp is "1" disposed in the second image 52. In addition, the control device 4 projects the content having Always_disp of 0 disposed in the overlapping region of the second image 52 while switching between the contents at regular time intervals. Note that even in a case of the content having Always_disp of 0 disposed in the second image 52, the control device 4 always projects the content in a case in which no other contents are disposed in the overlapping region.

In FIG. 13, the method of disposing each content on the second image 52 has been described, but the disposition of each content in the first image 51 may also be performed by the method shown in FIG. 13. In this case, the drawing data of the first image 51 may not include the disposition information indicating the disposition of each content.

FIG. 14 is a schematic diagram showing a modification example of the projection system 100. In addition to the configuration described, the projection system 100 may comprise a third projection device 8 and a fourth projection device 9. The configurations of the third projection device 8 and the fourth projection device 9 are the same as the configurations of the first projection device 1 and the second projection device 2. The control device 4 controls the projection by the third projection device 8 and the fourth projection device 9 in addition to the projection by the first projection device 1 and the second projection device 2.

A third device projection range 13 is a projection range of the third projection device 8 on the screen 6, and is a range different from the first device projection range 11 and the second device projection range 12. A fourth device projection range 14 is a projection range of the fourth projection device 9 on the screen 6, and is a range different from the first device projection range 11, the second device projection range 12, and the third device projection range 13. In the example shown in FIG. 14, the first device projection range 11, the second device projection range 12, the third device projection range 13, and the fourth device projection range 14 are ranges in which only some regions thereof overlap with each other.

In this case, the first system projection range 31 which constitutes the first projection range is a projection range having the first device projection range 11, the second device projection range 12, the third device projection range 13, and the fourth device projection range 14. Also in FIG. 14, for convenience of illustration, the first system projection range 31 is shown by a broken line frame slightly larger than an actual size.

The projection system 100 displays the projection target image onto the first system projection range 31 by projecting the division images by the first projection device 1, the second projection device 2, the third projection device 8, and the fourth projection device 9, respectively, and joining these four division images. The projection target image, which is projected onto the first system projection range 31 by the first projection device 1, the second projection device 2, the third projection device 8, and the fourth projection device 9, constitutes the first image.

FIG. 15 is a schematic diagram showing a state in which the projection is performed only by the first projection device 1, the second projection device 2, and the fourth projection device 9 shown in FIG. 14. For example, it is assumed that the projection onto the third device projection range 13 cannot be performed by the third projection device 8 due to a failure of the third projection device 8 or the like. In this case, the control device 4 performs the projection by using only the first projection device 1, the second projection device 2, and the fourth projection device 9 which can perform the projection.

In this case, the second system projection range 32 which constitutes the second projection range is a projection range having the first device projection range 11, the second device projection range 12, and the fourth device projection range 14. Also in FIG. 15, for convenience of illustration, the second system projection range 32 is shown by a broken line frame slightly larger than an actual size. The second system projection range 32 is not limited to a rectangle, as in the example shown in FIG. 15.

Figure 16:
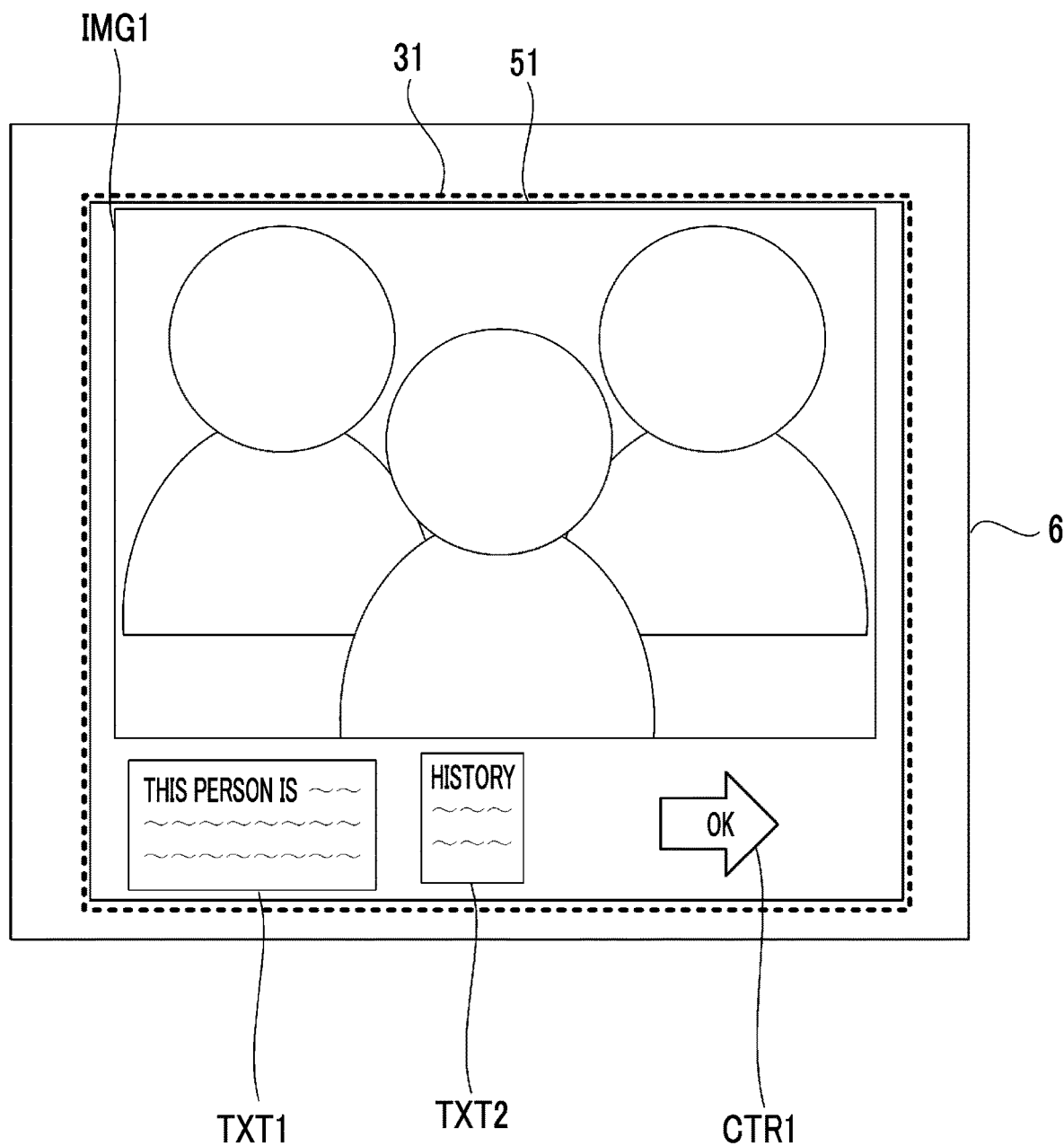
FIG. 16 is a schematic diagram showing an example of the projection of the first image 51 by each projection device shown in FIG. 14.

FIG. 16 is a schematic diagram showing an example of the projection of the first image 51 by each projection device shown in FIG. 14. In a case in which all of the first projection device 1, the second projection device 2, the third projection device 8, and the fourth projection device 9 can perform the projection, the control device 4 projects, for example, the first image 51 shown in FIG. 16 onto the first system projection range 31 (first projection range) by these projection devices.

Figure 17:
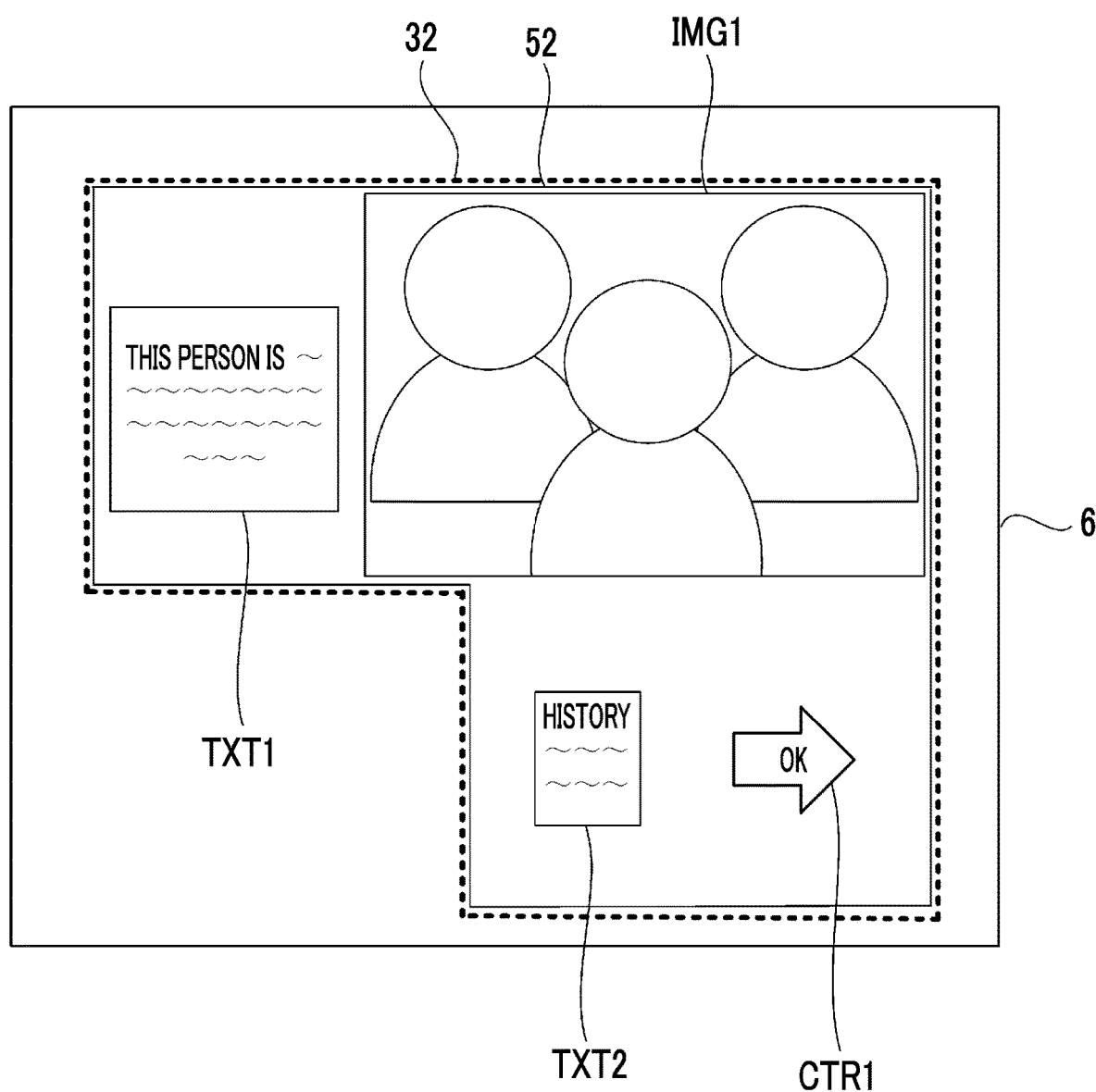
FIG. 17 is a schematic diagram showing an example of the projection of the second image 52 only by the first projection device 1, the second projection device 2, and the fourth projection device 9 shown in FIG. 15.

FIG. 17 is a schematic diagram showing an example of the projection of the second image 52 only by the first projection device 1, the second projection device 2, and the fourth projection device 9 shown in FIG. 15. For example, in a state in which the projection onto the third device projection range 13 by the third projection device 8 is not possible, and the projection can be performed only by the first projection device 1, the second projection device 2, and the fourth projection device 9 due to the failure of the third projection device 8 or the like, the control device 4 projects, for example, the second image 52 shown in FIG. 17 onto the second system projection range 32 by these projection devices that can perform the projection. The second image 52 in this case is an image having the same shape and size as the second system projection range 32 having the first device projection range 11, the second device projection range 12, and the fourth device projection range 14.

As shown in FIGS. 14 to 17, the number of projection devices in the projection system 100 is not limited to two, and may be four. In addition, the number of projection devices in the projection system 100 may be three, or five or more.

FIG. 18 is a schematic diagram showing another example of the projection of the second image 52 only by the first projection device 1, the second projection device 2, and the fourth projection device 9 shown in FIG. 15. A user 7 shown in FIG. 18 is a user (for example, a viewer of a presentation by a slide show) who observes the projection target image projected onto the screen 6.

The control device 4 may acquire range information indicating a range (range depending on the position of the user) relatively close to the user 7 in the second system projection range 32. In the example shown in FIG. 18, the range of the second system projection range 32 that is relatively close to the user 7 is, for example, a range of the second system projection range 32 having the fourth device projection range 14 shown in FIG. 15. The range information may be acquired, for example, based on the image obtained by the imaging by the imaging unit 5, may be acquired by user input, or may be acquired by another method.

In a case in which the control device 4 generates the second image 52, the control device 4 may preferentially dispose the content having a higher priority (Priority) in a region corresponding to the range in the second image 52 indicated by the range information based on the acquired range information. As a result, it is possible to project the content having a high priority to be close to the user 7 to improve the visibility.

As described above, in the present embodiment, the first attribute information, which is associated with the content and indicates whether or not an aspect ratio is made to be changeable in a case in which a size of the content is adjusted, is acquired by focusing on the fact that some of the contents disposed in the projected first image is important to maintain the aspect ratio, while others are not.

Moreover, in a case in which the partial projection device cannot perform the projection, the second image in which at least a part of the contents of the first image is disposed is projected onto the projectable range by the remaining projection device, and the size of the content in the second image is adjusted based on the first attribute information. As a result, the content in which the maintenance of the aspect ratio is important can be disposed in the second image by adjusting the size while maintaining the aspect ratio, and the content in which the maintenance of the aspect ratio is not important can be disposed in the second image by adjusting the size such that the aspect ratio is changeable.

Therefore, it is possible to flexibly dispose the content in which the maintenance of the aspect ratio is not important in the empty region of the second image while suppressing the decrease in the visibility of the content in which the maintenance of the aspect ratio is important. Therefore, even in a state in which the partial projection device cannot perform the projection, it is possible to project the second image for efficiently performing the information display onto the projectable region.

In addition in the present embodiment, the second attribute information, which is associated with the content and indicates whether the content is always projected or is alternately projected with other contents in a state in which the partial projection device cannot perform the projection, is acquired by focusing on the fact that some of the contents disposed in the projected first image need to be always displayed, while others are not.

Moreover, in a state in which the partial projection device cannot perform the projection, the second image in which at least a part of the contents of the first image is disposed is projected onto the projectable range by the remaining projection device, the content associated with the second attribute information indicating that the content is always projected is always projected in the projection of the second image, and the content associated with the second attribute information indicating that the content is alternately projected with other contents is alternately projected with other contents.

As a result, by alternately projecting the contents that do not need to be always displayed, the contents can be disposed larger with respect to the second image, or more contents can be disposed with respect to the second image. Therefore, even in a state in which the partial projection device cannot perform the projection, efficient information display can be performed.

In addition, in the present embodiment, the third attribute information indicating the display priority of each content is acquired. Moreover, in the generation of the second image, the size of the content is adjusted based on the third attribute information. As a result, it is possible to preferentially reduce and dispose the content having a low display priority in the second image. Therefore, it is possible to suppress the decrease in the visibility of the content having a high display priority.

(Other Modification Examples of Present Embodiment)

For example, as in the example shown in FIG. 15, in a case in which the second system projection range 32 includes a plurality of device projection ranges, the control device 4 may specify the device projection range of the projection device having a highest resolution. Moreover, the control device 4 may preferentially dispose the content having a higher priority (Priority) in the region corresponding to the specified device projection range in the second image 52. As a result, it possible to project the content having a high priority from the projection device having a high resolution to improve the visibility.

In addition, the control device 4 may designate the region of the content having Always_disp of 1, in which the projection is not performed, in a case in which the projection by the partial projection device cannot be performed. As a result, the region of the second image 52 onto which other contents can be projected is increased, so that more information can be projected.

In addition, the control device 4 may execute the processing of increasing the contrast of the content in a case in which the content having a priority of a certain value or higher is reduced and disposed in the second image. As a result, the decrease in the visibility due to the reduction of the important content can be compensated for by high contrast.

In addition, in a case in which the projection by the partial projection device cannot be performed and the second image 52 is displayed, the control device 4 may receive an instruction for size adjustment with respect to each content of the second image 52 from the user, and adjust the size of the content of the second image 52 depending on the result thereof. As a result, it is possible for the user to adjust the size of the content of the second image 52.

In addition, in the unsteady state in which the partial projection device in the projection system 100 cannot perform the projection, the control device 4 may output information indicating the unsteady state to the user. As a result, it is possible for the user to recognize that the partial projection device in the projection system 100 is in the unsteady state in which projection cannot be performed, and take measures, such as repair.

In addition, as in the example shown in FIG. 8, the configuration has been described in which the attribute information of the content is set for each content, but the attribute information of the content can be information of various forms as long as the information is associated with the content. For example, the first attribute information (Keep_aspect) may be a list of the contents in which the aspect ratio is maintained in a case in which the size of each content of the first image 51 is adjusted, or a list of the contents in which the aspect ratio is changeable in a case in which the size of each content of the first image 51 is adjusted.

In addition, although the case has been described in which the reduction is mainly performed as the size adjustment of the content in a case of generating the second image 52, the size adjustment is not limited to the reduction. That is, for example, in the processing shown in FIG. 13, in a case in which the empty region of the second image 52 is large in a case in which a certain content is disposed, the content may be disposed while maintaining the size of the content, or the content may be enlarged and disposed.

At least the following matters are described in the present specification.

(1)

A control device that controls projection by a plurality of projection units having different projection ranges, the (1)

device comprising a control unit that projects, by the plurality of projection units, a first image in which a content is disposed onto a first projection range having the projection ranges of the plurality of projection units, and an acquisition unit that acquires first attribute information which is associated with the content and indicates whether an aspect ratio is made to be changeable or is maintained in a case in which a size of the content is adjusted, in which the control unit projects a second image in which at least a part of the contents is disposed onto a second projection range having a projection range of a projection unit excluding a part of projection units among the plurality of projection units, and adjusts the size of the content in generation of the second image based on the first attribute information in a state in which projection is performed by the projection unit excluding the part of projection units among the plurality of projection units.

(2)

The control device according to (1), in which the state in which projection is performed by the projection unit excluding the part of projection units among the plurality of projection units is a state in which the part of projection units is in an unsteady state.

(3)

The control device according to (2), in which the control device gives a notification of information indicating the unsteady state in a case in which the part of projection units is in the unsteady state.

(4)

The control device according to any one of (1) to (3), in which, in generation of the second image, the control unit adjusts the size of the content associated with the first attribute information indicating that the aspect ratio is made to be changeable in a case in which the size is adjusted such that the aspect ratio is changeable, and adjusts the size of the content associated with the first attribute information indicating that the aspect ratio is maintained in a case in which the size is adjusted while maintaining the aspect ratio.

(5)

The control device according to any one of (1) to (4), in which the acquisition unit acquires second attribute information which is associated with the content and indicates whether the content is always projected or is alternately projected with other contents in the state in which projection is performed by the projection unit excluding the part of projection units among the plurality of projection units, and the control unit performs generation and projection of the second image based on the second attribute information.

(6)

The control device according to (5), in which, in projection of the second image, the control unit always projects the content associated with the second attribute information indicating that the content is always projected, and alternately projects the content, with other contents, associated with the second attribute information indicating that the content is alternately projected with the other contents in the state in which projection is performed by the projection unit excluding the part of projection units among the plurality of projection units.

(7)

The control device according to any one of (1) to (6), in which the content includes a plurality of contents, the acquisition unit acquires third attribute information indicating at least two or more priorities of the plurality of contents, and in generation of the second image, the control unit adjusts the size of the content based on the third attribute information.

(8)

The control device according to any one of (1) to (7), in which the content includes a plurality of contents, and the control unit disposes the plurality of contents in the second image in a priority order depending on at least two or more data types of the plurality of contents.

(9)

The control device according to any one of (1) to (8), in which the control unit disposes a reduced content in the second image by increasing a contrast of the reduced content.

(10)

The control device according to any one of (1) to (9), in which the content includes a plurality of contents, the acquisition unit acquires third attribute information indicating at least two or more priorities of the plurality of contents, and in generation of the second image, the control unit preferentially disposes a content having a higher priority in a region of the second image corresponding to a range in the second projection range corresponding to a position of a user who observes the projection range based on range information indicating the range corresponding to the position of the user and the third attribute information.

(11)

The control device according to any one of (1) to (10), in which the content includes a plurality of contents, the acquisition unit acquires third attribute information indicating at least two or more priorities of the plurality of contents, and in generation of the second image, the control unit preferentially disposes a content having a higher priority in a region of the second image corresponding to a projection unit having a highest resolution among two or more projection units based on the third attribute information in a case in which the projection unit excluding the part of projection units among the plurality of projection units includes the two or more projection units.

(12)

A control method of controlling projection by a plurality of projection units having different projection ranges, the method comprising a control step of projecting, by the plurality of projection units, a first image in which a content is disposed onto a first projection range having the projection ranges of the plurality of projection units, and an acquisition step of acquiring first attribute information which is associated with the content and indicates whether an aspect ratio is made to be changeable or is maintained in a case in which a size of the content is adjusted, in which in the control step, a second image in which at least a part of the contents is disposed is projected onto a second projection range having a projection range of a projection unit excluding a part of projection units among the plurality of projection units, and the size of the content is adjusted in generation of the second image based on the first attribute information in a state in which projection is performed by the projection unit excluding the part of projection units among the plurality of projection units.

(13)

The control method according to (12), in which the state in which projection is performed by the projection unit excluding the part of projection units among the plurality of projection units is a state in which the part of projection units is in an unsteady state.

(14)

The control method according to (13), in which a notification of information indicating the unsteady state is given in a case in which the part of projection units is in the unsteady state.

(15)

The control method according to any one of (12) to (14), in which, in generation of the second image, in the control step, the size of the content associated with the first attribute information indicating that the aspect ratio is made to be changeable in a case in which the size is adjusted is adjusted such that the aspect ratio is changeable, and the size of the content associated with the first attribute information indicating that the aspect ratio is maintained in a case in which the size is adjusted is adjusted while maintaining the aspect ratio.

(16)

The control method according to any one of (12) to (15), in which in the acquisition step, second attribute information which is associated with the content and indicates whether the content is always projected or is alternately projected with other contents in the state in which projection is performed by the projection unit excluding the part of projection units among the plurality of projection units, is acquired, and in the control step, generation and projection of the second image are performed based on the second attribute information.

(17)

The control method according to (16), in which, in projection of the second image, in the control step, the content associated with the second attribute information indicating that the content is always projected is always projected, and the content associated with the second attribute information indicating that the content is alternately projected with other contents is alternately projected with the other contents in the state in which projection is performed by the projection unit excluding the part of projection units among the plurality of projection units.

(18)

The control method according to any one of (12) to (17), in which the content includes a plurality of contents, in the acquisition step, third attribute information indicating at least two or more priorities of the plurality of contents is acquired, and in generation of the second image, in the control step, the size of the content is adjusted based on the third attribute information.

(19)

The control method according to any one of (12) to (18), in which the content includes a plurality of contents, and in the control step, the plurality of contents are disposed in the second image in a priority order depending on at least two or more data types of the plurality of contents.

(20)

The control method according to any one of (12) to (19), in which in the control step, a reduced content is disposed in the second image by increasing a contrast of the reduced content.

(21)

The control method according to any one of (12) to (20), in which the content includes a plurality of contents, in the acquisition step, third attribute information indicating at least two or more priorities of the plurality of contents is acquired, and in generation of the second image, in the control step, a content having a higher priority in a region of the second image corresponding to a range in the second projection range corresponding to a position of a user who observes the projection range is preferentially disposed based on range information indicating the range corresponding to the position of the user and the third attribute information.

(22)

The control method according to any one of (12) to (21), in which the content includes a plurality of contents, in the acquisition step, third attribute information indicating at least two or more priorities of the plurality of contents is acquired, and in generation of the second image, in the control step, a content having a higher priority is preferentially disposed in a region of the second image corresponding to a projection unit having a highest resolution among two or more projection units based on the third attribute information in a case in which the projection unit excluding the part of projection units among the plurality of projection units includes the two or more projection units.

(23)

A control program causing a computer to function as the acquisition unit and the control unit of the control device according to any one of (1) to (11).

(24)

A projection system comprising the control device according to any one of (1) to (11), and the plurality of projection units.

Various embodiments have been described above with reference to the drawings, but it is needless to say that the present invention is not limited thereto. It is obvious that those skilled in the art can conceive various changes or modifications within the scope described in the claims, and naturally, such changes or modifications also belong to the technical scope of the present invention. In addition, the components in the embodiments described above may be optionally combined without departing from the spirit of the invention.

Note that the present application is based on a Japanese patent application filed on Sep. 27, 2019 (JP2019-177951), the contents of which are incorporated herein by reference.

EXPLANATION OF REFERENCES

1: first projection device
2: second projection device
4: control device
4$a$: storage medium
5: imaging unit
6: screen
7: user
8: third projection device
9: fourth projection device
11: first device projection range
12: second device projection range
13: third device projection range
14: fourth device projection range
21: display unit
21$a$: light source
21$b$: optical modulation unit
22: projection optical system
23: projection unit
24, 42: control unit
31: first system projection range
32: second system projection range
41: acquisition unit
42$a$: image generation unit
42$b$: projection control unit
51: first image
52: second image
61, 62: projection state
80: attribute information table
100: projection system IMG1: image content
TXT1 TXT2: text content
CTR1: operating part

What is claimed is:

1. A control device that controls projection by a plurality of projection units having different projection ranges, the device comprising:
 a control unit that projects, by the plurality of projection units, a first image in which at least one content image is disposed on a first projection range having the projection ranges of the plurality of projection units; and
 an acquisition unit that acquires first attribute information associated with the content image, the first attribute information indicating whether an aspect ratio of the content image is made to be changeable in a case in which a size of the content image is changed or whether the aspect ratio of the content image is maintained in a case in which a size of the content image is changed,
 wherein, in a state in which projection is performed by a projection unit, among the plurality of projection units, except a part of the plurality of projection units, the control unit projects a second image in which at least a part of the content image is disposed on a second projection range having a projection range of the projection unit except the part of the plurality of projection units, and adjusts the size of the content image in generation of the second image based on the first attribute information.

2. The control device according to claim 1, wherein the state in which projection is performed by the projection unit except the part of the plurality of projection units is a state in which the part of the plurality of projection units is in an unsteady state.

3. The control device according to claim 2, wherein the control device gives a notification of information indicating the unsteady state in a case in which the part of the plurality of projection units is in the unsteady state.

4. The control device according to claim 1, wherein, in generation of the second image, the control unit adjusts the size of the content image associated with the first attribute information indicating that the aspect ratio of the content image is made to be changeable in a case in which the size of the content image is changed such that the aspect ratio of the content image is changeable, and adjusts the size of the content image associated with the first attribute information indicating that the aspect ratio of the content image is maintained in a case in which the size of the content image is changed while maintaining the aspect ratio of the content image.

5. The control device according to claim 1, wherein, in the state in which projection is performed by the projection unit except the part of the plurality of projection units, the acquisition unit acquires second attribute information associated with the content image, the second attribute information indicating whether the content image is always projected or the content image and another content image are alternately projected, and
 the control unit performs generation and projection of the second image based on the second attribute information.

6. The control device according to claim 5, wherein, in the state in which projection is performed by the projection unit except the part of the plurality of projection units, in projection of the second image, the control unit always projects the content image associated with the second attribute information indicating that the content image is always projected, and alternately projects the another content image and the content image associated with the second attribute information indicating that the content image and the another content image are alternately projected.

7. The control device according to claim 1, wherein the at least one content image includes a plurality of content images,
 the acquisition unit acquires third attribute information indicating at least two priorities of the plurality of content images, and
 in generation of the second image, the control unit adjusts the size of the content image based on the third attribute information.

8. The control device according to claim 1, wherein the at least one content image includes a plurality of content images, and
 the control unit disposes the plurality of content images in the second image in a priority order depending on at least two data types of the plurality of content images.

9. The control device according to claim 1, wherein the control unit disposes, in the second image, a reduced content image with a contrast of the reduced content image increased.

10. The control device according to claim 1, wherein the at least one content image includes a plurality of content images,
 the acquisition unit acquires third attribute information indicating at least two priorities of the plurality of content images, and
 in generation of the second image, the control unit preferentially disposes a content image having a higher priority in a region, of the second image corresponding to a range in the second projection range corresponding to a position of a user who observes the projection range based on range information indicating the range corresponding to the position of the user and the third attribute information.

11. The control device according to claim 1, wherein the at least one content image includes a plurality of content images,
 the acquisition unit acquires third attribute information indicating at least two priorities of the plurality of content images, and,
 in a case in which the projection unit except the part of the plurality of projection units includes two or more projection units, the control unit preferentially disposes a content image having a higher priority in a region, of the second image, corresponding to a projection unit having a highest resolution among the two or more projection units based on the third attribute information in generation of the second image.

12. A control method of controlling projection by a plurality of projection units having different projection ranges, the method comprising:
 a control step of projecting, by the plurality of projection units, a first image in which at least one content image is disposed on a first projection range having the projection ranges of the plurality of projection units; and
 an acquisition step of acquiring first attribute information which is associated with the content image and indicates whether an aspect ratio of the content image is made to be changeable in a case in which a size of the content image is changed or the aspect ratio of the content image is maintained in a case in which the site of the content image is changed, wherein, in a state in which projection is performed by a projection unit, among the plurality of projection units, except a part of the plurality of projection units, a second image in which at least a part of the content image is disposed is projected on a second projection range having a projection range of the projection unit except the part of the plurality of projection units, and the size of the content image is adjusted in generation of the second image based on the first attribute information in the control step.

13. The control method according to claim 12, wherein the state in which projection is performed by the projection unit except the part of the plurality of projection units is a state in which the part of the plurality of projection units is in an unsteady state.

14. The control method according to claim 13, wherein, in a case in which the part of the plurality of projection units is in the unsteady state, a notification of information indicating the unsteady state is given.

15. The control method according to claim 12, wherein, in generation of the second image in the control step, the size of the content image associated with the first attribute information indicating that the aspect ratio of the content image is made to be changeable in a case in which the size of the content image is changed is adjusted such that the aspect ratio of the content image is changeable, and the size of the content image associated with the first attribute information indicating that the aspect ratio of the content image is maintained in a case in which the size of the content image is changed is adjusted while maintaining the aspect ratio of the content image.

16. The control method according to claim 12, wherein, in the state in which projection is performed by the projection unit except the part of the plurality of projection units, second attribute information associated with the content image and indicating whether the content image is always projected or the content image and another content image are alternately projected is acquired in the acquisition step, and, in the control step, generation and projection of the second image are performed based on the second attribute information.

17. The control method according to claim 16, wherein, in the state in which projection is performed by the projection unit except the part of the plurality of projection units, in projection of the second image in the control step, the content image associated with the second attribute information indicating that the content image is always projected is always projected, and another content image and the content image associated with the second attribute information indicating that the content image and the another content image are alternately projected are alternately projected.

18. The control method according to claim 12, wherein the at least one content image includes a plurality of content images, in the acquisition step, third attribute information indicating at least two priorities of the plurality of content images is acquired, and, in generation of the second image in the control step, the size of the content image is adjusted based on the third attribute information.

19. The control method according to claim 12, wherein the at least one content image includes a plurality of content images, and in the control step, the plurality of content images are disposed in the second image in a priority order depending on at least two data types of the plurality of content images.

20. The control method according to claim 12, wherein in the control step, a reduced content image is disposed in the second image with a contrast of the reduced content image increased.

21. The control method according to claim 12, wherein the at least one content image includes a plurality of content images, in the acquisition step, third attribute information indicating at least two priorities of the plurality of content images is acquired, and in generation of the second image in the control step, a content image having a higher priority is preferentially disposed in a region, of the second image, corresponding to a range in the second projection range corresponding to a position of a user who observes the projection range based on range information indicating the range corresponding to the position of the user and the third attribute information.

22. The control method according to claim 12, wherein the at least one content image includes a plurality of content images, in the acquisition step, third attribute information indicating at least two priorities of the plurality of content images is acquired, and, in a case in which the projection unit except the part of the plurality of projection units includes two or more projection units, a content image having a higher priority is preferentially disposed in a region, of the second image, corresponding to a projection unit having a highest resolution among the two or more projection units based on the third attribute information in generation of the second image in the control step.

23. A non-transitory computer readable medium storing a control program causing a computer to function as the acquisition unit and the control unit of the control device according to claim 1.

24. A projection system comprising:
the control device according to claim 1; and
the plurality of projection units.

* * * * *